United States Patent
Guo et al.

(10) Patent No.: US 11,972,247 B2
(45) Date of Patent: Apr. 30, 2024

(54) SOFTWARE UPGRADING METHOD, APPARATUS, AND SYSTEM

(71) Applicant: HUAWEI TECHNOLOGIES CO., LTD., Guangdong (CN)

(72) Inventors: Zhipeng Guo, Shanghai (CN); Jianfen Peng, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 143 days.

(21) Appl. No.: 17/745,580

(22) Filed: May 16, 2022

(65) Prior Publication Data

US 2022/0276856 A1     Sep. 1, 2022

Related U.S. Application Data

(63) Continuation of application No. PCT/CN2020/098352, filed on Jun. 28, 2020.

(30) Foreign Application Priority Data

Nov. 18, 2019   (CN) .......................... 201911129069.3

(51) Int. Cl.
G06F 8/65         (2018.01)

(52) U.S. Cl.
CPC .................................... *G06F 8/65* (2013.01)

(58) Field of Classification Search
CPC .......................................................... G06F 8/65
USPC .......................................................... 717/169
See application file for complete search history.

(56) References Cited

U.S. PATENT DOCUMENTS

| 7,536,687 B1 | 5/2009 | Myers |
| 2017/0034023 A1* | 2/2017 | Nickolov ............ H04L 43/0817 |
| 2018/0321929 A1 | 11/2018 | Persson et al. |

FOREIGN PATENT DOCUMENTS

| CN | 103019767 A | 4/2013 |
| CN | 103455348 A | 12/2013 |
| CN | 105843656 A | 8/2016 |
| CN | 108959122 A | 12/2018 |

(Continued)

OTHER PUBLICATIONS

Extended European Search Report in European Appln No. 20890139.7, dated Nov. 7, 2022, 9 pages.

(Continued)

*Primary Examiner* — John Q Chavis
(74) *Attorney, Agent, or Firm* — Fish & Richardson P.C.

(57) ABSTRACT

Example software upgrading methods and apparatus are described. In one example, storage resource information of at least two components in a terminal is received. Storage resource feedback information is generated. The storage resource feedback information is sent to a network side device. Upgrade package block information generated by the network side device is received, where the upgrade package block information includes at least a one-to-one correspondence between a plurality of upgrade package blocks for terminal software upgrading and a plurality of components for storing the plurality of upgrade package blocks. At least one piece of indication information used to indicate the plurality of components to obtain the plurality of upgrade package blocks are generated. The at least one piece of indication information is sent to the plurality of components.

20 Claims, 22 Drawing Sheets

(56) References Cited

FOREIGN PATENT DOCUMENTS

| JP | 2005115920 A | 4/2005 |
|---|---|---|
| JP | 2016192183 A | 11/2016 |
| WO | 2019077607 A1 | 4/2019 |

OTHER PUBLICATIONS

International Search Report and Written Opinion in International Appln. No. PCT/CN2020/098352, dated Apr. 12, 2021, 10 pages (with English translation).
Office Action in Japanese Appln. No. 2022-528690, mailed on Dec. 25, 2023, 26 pages (with English translation).

\* cited by examiner

SOFTWARE UPGRADING METHOD, APPARATUS, AND SYSTEM

CROSS-REFERENCE TO RELATED APPLICATIONS

This application is a continuation of International Application No. PCT/CN2020/098352, filed on Jun. 28, 2020, which claims priority to Chinese Patent Application No. 201911129069.3, filed on Nov. 18, 2019. The disclosures of the aforementioned applications are hereby incorporated by reference in their entireties.

TECHNICAL FIELD

The present application relates to a terminal software upgrading technology, and in particular, to a software upgrading method, apparatus, and system for an intelligent connected vehicle.

BACKGROUND

With the development of intelligent connected vehicles, on-line upgrading of automobile components by using an over the air (OTA) technology has become an important function of the intelligent connected vehicles. A vehicle manufacturer upgrades related software of vehicles by using an OTA function. This helps the manufacturer reduce recall costs, quickly respond to requirements, and improve user experience.

An intelligent connected vehicle includes a plurality of components, for example, a central gateway, a T-box (Telematics BOX, vehicle communication terminal in the Internet of vehicles), a human-machine interaction (HMI) controller, a mobile data center (MDC, Mobile Data Controller), and an advanced driver assistant system (ADAS, Advanced Driving Assistant System). The plurality of components in the vehicle may need to be upgraded to implement OTA-based upgrading of the entire vehicle. In this case, upgrading software with a relatively large storage capacity needs to be downloaded. In addition to an intelligent connected vehicle, a terminal includes various existence forms such as a smartphone, an industrial Internet of Things device, and an intelligent robot. In addition, with the progress of intelligent technologies, a terminal implements increasing functions but has an increasingly complex internal structure. Therefore, during terminal software upgrading, there is an increasingly high requirement for storage space of the terminal.

In a conventional technology, a single-module downloading solution is used. To be specific, one upgrade control module is used to complete downloading, storage, block division, and distribution of a terminal software upgrade package and control each component in a terminal to complete an upgrading operation. When a data volume of the software upgrade package is quite large, a relatively high requirement is put forwarded on storage space of the upgrade control module in such a single-module downloading policy.

When there are sufficient storage resources in the upgrade control module, as shown in FIG. 1, a method for downloading the terminal software upgrade package based on the single module includes the following phases.

(1) Downloading phase: After an OTA cloud-side device starts downloading, the upgrade control module checks its own storage resource; and if the storage resource satisfies a requirement for downloading the terminal software upgrade package, the upgrade control module downloads all software upgrade packages from the OTA cloud-side device, and verifies integrity of the downloaded files.

(2) Distribution phase: The upgrade control module divides the software upgrade package, and distributes upgrade package blocks to components that are in the terminal and that need to be upgraded.

(3) Installation phase: The upgrade control module controls the components that need to be upgraded, to install the software upgrade package and activate upgrade software.

When there are insufficient storage resources in the upgrade control module, as shown in FIG. 2, a method for downloading the terminal software upgrade package based on the single module includes: After the OTA cloud-side device starts downloading, the upgrade control module checks its own storage resource; and if the storage resource does not satisfy a storage requirement of the terminal software upgrade package, the upgrade control module returns information that the resource is insufficient, and terminates downloading, leading to an upgrade failure.

It can be learned that, when a local storage resource in the upgrade control module is insufficient, terminal software upgrading quite easily fails. Therefore, a method for increasing a software upgrading success rate of the terminal is urgently needed.

SUMMARY

In view of the foregoing technical problems in the conventional technology, embodiments of the present application provide a software upgrading method, apparatus, and system. "Software" in the claims of the present application and the summary in this specification is software in a broad sense, including but not limited to firmware, a computer program, an operating system, a driver, system software, or an application program.

According to a first aspect, a software upgrading method is provided, including: receiving storage resource information of at least two components in a terminal, where the storage resource information includes at least an available storage capacity of each of the at least two components, and the at least two components correspond to the at least two available storage capacities; generating storage resource feedback information based on the storage resource information, where the storage resource feedback information includes at least the available storage capacity of each component; sending the storage resource feedback information to a network side device; receiving upgrade package block information generated by the network side device, where the upgrade package block information includes at least a one-to-one correspondence between a plurality of upgrade package blocks for terminal software upgrading and a plurality of components for storing the plurality of upgrade package blocks, and the plurality of components are some or all of the at least two components; generating, based on the upgrade package block information, at least one piece of indication information used to indicate the plurality of components to obtain the plurality of upgrade package blocks, where the plurality of components are in a one-to-one correspondence with the plurality of available storage capacities; and sending the at least one piece of indication information to the plurality of components.

The foregoing method is a software upgrading method performed on a terminal side. "At least some" is equivalent to "some or all". Optionally, the storage resource feedback information further includes an identifier of each of at least some of the at least two components. The at least two components may be all components in the terminal, or may be only some components in the terminal, because there may be a component in which a storage resource has been used up or a component that reserves a storage resource for another operation. The receiving storage resource information of at least two components in a terminal may be performed in one or more receiving manners. The receiving manner includes but is not limited to cellular communication, Wi-Fi (Wireless Fidelity, wireless local area network), WiMAX (Worldwide Interoperability for Microwave Access), Bluetooth (Bluetooth communication technology), ZigBee (ZigBee communication technology), optical communication, satellite communication, infrared communication, transmission line communication, performing receiving through wiring on a hardware interface or a hardware circuit board, obtaining a parameter from a software module, or reading information from a storage device. In addition to the available storage capacity of each of the at least two components, the storage resource information may include other information, for example, a quantity, identifiers, or a total available storage capacity of the at least two components. Not all of the available storage capacities of the at least two components may be placed in the storage resource feedback information because it may be determined, on the terminal side based on the available storage capacity in the storage resource information, that one or more networking modules in the at least two components may not be used to store a terminal software upgrade package. Certainly, the foregoing determining operation may not be performed on the terminal side but on a network side. Because upgrade software may not need to occupy all of the at least two components, the plurality of components may be some of the at least two components. The sending the at least one piece of indication information may be performed in one or more sending manners. The sending manner includes but is not limited to cellular communication. Wi-Fi (Wireless Fidelity, wireless local area network), WiMAX (Worldwide Interoperability for Microwave Access), Bluetooth (Bluetooth communication technology), ZigBee (ZigBee communication technology), optical communication, satellite communication, infrared communication, transmission line communication, performing sending through wiring on a hardware interface or a hardware circuit board, inputting a parameter into the software module, or writing information into the memory. The storage resource information of the terminal is reported to the network-side device, and the network-side device adaptively obtains the plurality of upgrade package blocks through division based on an actual available storage resource in the terminal. This fully utilizes storage resources in the plurality of components in the terminal, and reduces software package storage pressure of the components on the terminal side compared with a conventional technology. In addition, because a relatively large quantity of random storage resources need to be occupied during block division of a relatively large data packet, a requirement for the storage resources in the components on the terminal side can be reduced when block division is performed on an upgrade package on the network side. Finally, a software upgrading success rate can be increased. Therefore, the software upgrading method is more suitable for software upgrading of the terminal (especially an intelligent connected vehicle).

According to the first aspect, in a first possible implementation of the software upgrading method, the upgrade package block information further includes a download address of each of the plurality of upgrade package blocks, and each piece of indication information in the at least one piece of indication information includes a download address of at least one of the plurality of upgrade package blocks. Terminal software may be stored in one device on the network side in a centralized manner, or may be stored in a plurality of devices on the network side in a distributed manner. Therefore, optionally, there are one or more download addresses for the plurality of upgrade package blocks, or at least some of the plurality of upgrade package blocks share one download address. The download address is used to indicate, to a component, a network side device in which an upgrade package block corresponding to the component is located.

According to the first aspect or the first possible implementation of the first aspect, in a second possible implementation of the software upgrading method, the upgrade package block information further includes verification information of each of the plurality of upgrade package blocks, and each piece of indication information in the at least one piece of indication information includes verification information of at least one of the plurality of upgrade package blocks. Each upgrade package block is independently verified, so that a computing resource of a device in the terminal can be further fully utilized. Optionally, the upgrade package block information further includes a quantity of the plurality of upgrade package blocks, and the method further includes a step of performing overall verification based on a verification result of each upgrade package block and the quantity of the plurality of upgrade package blocks.

According to any one of the first aspect or the foregoing implementations of the first aspect, in a third possible implementation of the software upgrading method, the at least one piece of indication information includes an external communication resource used by the plurality of components to obtain at least one of the plurality of upgrade package blocks. The external communication resource is a communication resource used by the components in the terminal to communicate with a device outside the terminal (for example, a cellular communication resource applied to inter-vehicle network communication). The external communication resource includes but is not limited to a communication component, a communication channel, a communication interface, or another communication resource used for cellular communication, satellite communication, Bluetooth communication, Wi-Fi (Wireless Fidelity, wireless local area network), or wired communication. Optionally, the external communication resource includes an external communication resource of each of the plurality of components, or an external communication resource of one or more components other than the plurality of components in the terminal. Optionally, each of the plurality of components obtains one of the plurality of upgrade package blocks by using an external communication resource of the component or by using an external communication resource of the terminal other than the external communication resource of the component.

According to any one of the first aspect or the foregoing implementations of the first aspect, in a fourth possible implementation of the software upgrading method, the at least one piece of indication information includes time information used by the plurality of components to obtain at least one of the plurality of upgrade package blocks. Optionally, the time information indicates that the plurality of components obtain the plurality of upgrade package blocks simultaneously or sequentially. Optionally, the time information indicates that the plurality of components periodically obtain the at least one upgrade package block.

According to any one of the first aspect or the foregoing implementations of the first aspect, in a fifth possible implementation of the software upgrading method, before the generating storage resource feedback information, the method further includes: determining, based on the available storage capacity of each of the at least two components, that an available storage resource in the terminal satisfies a storage requirement for terminal software upgrading. When starting downloading to the terminal device, the network side device sends a storage requirement of a plurality of to-be-downloaded terminal software upgrade packages to the terminal device, and the terminal device determines whether the available storage resource in the terminal satisfies the storage requirement of the plurality of terminal software upgrade packages. In this way, the terminal device has higher autonomy and privacy. Optionally, if a difference obtained by subtracting a sum of storage space occupied by the software upgrade packages from a sum of the available storage capacities exceeds a predetermined threshold, it is determined that the available storage resource in the terminal satisfies the storage requirement for terminal software upgrading.

According to any one of the first aspect or the foregoing implementations of the first aspect, in a sixth possible implementation of the software upgrading method, the at least one piece of indication information is a plurality of pieces of indication information, and the plurality of pieces of indication information are in a one-to-one correspondence with the plurality of components; and the sending the at least one piece of indication information to the plurality of components includes: sending, to each of the plurality of components, one piece of indication information that is in the plurality of pieces of indication information and that corresponds to the component. Optionally, the plurality of pieces of indication information are sent simultaneously or sequentially.

According to any one of the first aspect or the foregoing implementations of the first aspect, in a seventh possible implementation of the software upgrading method, the at least one piece of indication information is one piece of indication information, and the sending the at least one piece of indication information to the plurality of components includes: sending the one piece of indication information to each of the plurality of components. In this manner, the one piece of indication information includes related information used by each of the plurality of components to obtain one of the plurality of upgrade package blocks. Optionally, the one piece of indication information is sent to all of the plurality of components simultaneously or sequentially.

According to any one of the first aspect or the foregoing implementations of the first aspect, in an eighth possible implementation of the software upgrading method, the at least one piece of indication information is one piece of indication information, and the sending the at least one piece of indication information to the plurality of components includes: sending the one piece of indication information to one of the plurality of components. In this manner, the one piece of indication information may be transmitted between the plurality of components.

According to any one of the first aspect or the foregoing implementations of the first aspect, in a ninth possible implementation of the software upgrading method, the method further includes: sending a download instruction to the plurality of components, where the download instruction is used to instruct the plurality of components to obtain the plurality of upgrade package blocks in a one-to-one correspondence with the plurality of components.

According to any one of the first aspect or the foregoing implementations of the first aspect, in a tenth possible implementation of the software upgrading method, the method further includes: sending an upgrade package distribution instruction to the plurality of components, where the upgrade package distribution instruction is used to instruct the plurality of components to send one or more of the plurality of upgrade package blocks to at least one component in the terminal other than the plurality of components, and the one or more upgrade package blocks are obtained by the plurality of components by parsing the plurality of upgrade package blocks in a one-to-one correspondence with the plurality of components.

According to any one of the first aspect or the foregoing implementations of the first aspect, in an eleventh possible implementation of the software upgrading method, the method further includes: sending an installation activation instruction to the plurality of components, where the installation activation instruction is used to instruct to install and activate at least one piece of upgrade software in the plurality of components, and the at least one piece of upgrade software is obtained by the plurality of components by parsing the plurality of upgrade package blocks in a one-to-one correspondence with the plurality of components.

According to any one of the first aspect or the foregoing implementations of the first aspect, in a twelfth possible implementation of the software upgrading method, the available storage capacity includes at least one of an available storage capacity in a random access memory (RAM) or an available storage capacity in a read-only memory (ROM).

According to any one of the first aspect or the foregoing implementations of the first aspect, in a thirteenth possible implementation of the software upgrading method, each of the plurality of upgrade package blocks includes all or some of upgrade software packages used for upgrading at least one component in the terminal.

According to a second aspect, a software upgrading method is provided. The method is a software upgrading method performed on a network side, and includes: receiving storage resource feedback information from a terminal device, where the storage resource feedback information includes at least an available storage capacity of each of a plurality of components that are in the terminal device and that may be used to store a plurality of upgrade package blocks; dividing one or more software upgrade packages into a plurality of upgrade package blocks based on the storage resource feedback information, where the plurality of upgrade package blocks are in a one-to-one correspondence with at least some of the available storage capacities of all the components; generating upgrade package block information, where the upgrade package block information includes at least a correspondence between the plurality of upgrade package blocks and at least some of the available storage capacities of all the components; and sending the upgrade package block information to the terminal device.

Optionally, the dividing one or more software upgrade packages into a plurality of upgrade package blocks includes: performing block division and re-encapsulation on a software upgrade package (for example, a vehicle upgrade package) that occupies a relatively large storage capacity, to obtain a plurality of upgrade package blocks, or performing grouping and re-encapsulation on a plurality of software upgrade packages (for example, one software upgrade package corresponds to one piece of upgrade software) to obtain a plurality of upgrade package blocks. The one or more software upgrade packages are divided into the plurality of upgrade package blocks that are in a one-to-one correspondence with the at least some components. This fully utilizes storage resources in the plurality of components in the terminal, and reduces software upgrade package storage pressure of the components on a terminal side compared with a conventional technology. In addition, because a relatively large quantity of random storage resources need to be occupied during block division of a relatively large data packet, a requirement for the storage resources in the components on the terminal side can be reduced when block division is performed on an upgrade package on the network side. Finally, a software upgrading success rate can be increased. Therefore, the software upgrading method is more suitable for software upgrading of the terminal (especially an intelligent connected vehicle).

According to the second aspect, in a first possible implementation of the software upgrading method, the upgrade package block information includes at least one of verification information of each of the plurality of upgrade package blocks, a download address of each upgrade package block, or a quantity of the plurality of upgrade package blocks. The upgrade package block information includes the verification information of each upgrade package block, so that each upgrade package block can be independently verified, thereby fully utilizing computing resources of a plurality of available components in the terminal. The upgrade package block information includes the download address of each upgrade package block, and may indicate, to the plurality of components in the terminal, a network side device configured to obtain the plurality of upgrade package blocks. The upgrade package block information includes the quantity of upgrade package blocks, and may be used to perform overall data integrity verification on the plurality of upgrade package blocks.

According to the second aspect or the first possible implementation of the second aspect, in a second possible implementation of the software upgrading method, before the receiving storage resource feedback information from a terminal device, the method further includes: sending a software upgrading starting message to the terminal device. In addition to the network side device, the terminal device may start software upgrading.

According to any one of the second aspect or the foregoing implementations of the second aspect, in a third possible implementation of the software upgrading method, before the dividing one or more software upgrade packages into a plurality of upgrade package blocks, the method further includes: determining, based on the storage resource feedback information, that an available storage resource in the terminal device satisfies a storage requirement for software upgrading. Optionally, if a difference obtained by subtracting a sum of storage space occupied by software upgrade packages from a sum of the available storage capacities exceeds a predetermined threshold, it is determined that the available storage resource in the terminal device satisfies the storage requirement for software upgrading.

According to any one of the second aspect or the foregoing implementations of the second aspect, in a fourth possible implementation of the software upgrading method, the dividing one or more software upgrade packages into a plurality of upgrade package blocks includes: preferably assigning an upgrade package block obtained by dividing a software upgrade package that occupies relatively large storage space to a component that has a relatively large available storage capacity. The plurality of upgrade package blocks are in a one-to-one correspondence with the plurality of components. In this manner, a case in which a software upgrade package cannot be determined as any one of the plurality of upgrade package blocks because the software upgrade package is excessively large can be avoided as much as possible.

According to any one of the second aspect or the foregoing implementations of the second aspect, in a fifth possible implementation of the software upgrading method, the method further includes: sending an upgrade package distribution instruction to at least one upgrade software storage apparatus on the network side, where the upgrade package distribution instruction is used to instruct the at least one upgrade software storage apparatus on the network side to send at least one of the plurality of upgrade package blocks to the terminal device.

According to any one of the second aspect or the foregoing implementations of the second aspect, in a sixth possible implementation of the software upgrading method, the method further includes: sending at least one of the plurality of upgrade package blocks to the terminal device.

According to the sixth possible implementation of the second aspect, in a seventh possible implementation of the software upgrading method, before the sending at least one of the plurality of upgrade package blocks to the terminal device, the method further includes: receiving the at least one of the plurality of upgrade package blocks from the at least one upgrade software storage apparatus on the network side.

According to any one of the second aspect or the foregoing implementations of the second aspect, in an eighth possible implementation of the software upgrading method, the available storage capacity includes at least one of an available storage capacity in a random access memory (RAM) or an available storage capacity in a read-only memory (ROM).

According to any one of the second aspect or the foregoing implementations of the second aspect, in a ninth possible implementation of the software upgrading method, each of the plurality of upgrade package blocks includes all or some of upgrade software packages used for upgrading at least one component in the terminal.

According to a third aspect, a software upgrading apparatus is provided. The apparatus includes: a receiving unit, configured to receive storage resource information of at least two components in a terminal, where the storage resource information includes at least an available storage capacity of each of the at least two components, and the at least two components correspond to the at least two available storage capacities; a processing unit, configured to generate storage resource feedback information based on the storage resource information, where the storage resource feedback information includes at least the available storage capacity of each component; and a sending unit, configured to send the storage resource feedback information to a network side device. The receiving unit is further configured to receive upgrade package block information generated by the network side device, where the upgrade package block information includes at least a one-to-one correspondence between a plurality of upgrade package blocks for terminal software upgrading and a plurality of available storage capacities in the at least two available storage capacities. The processing unit is further configured to generate, based on the upgrade package block information, at least one piece of indication information used to indicate the plurality of components to obtain the plurality of upgrade package blocks, where the plurality of components are in a one-to-one correspondence with the plurality of available storage capacities. The sending unit is further configured to send the at least one piece of indication information to the plurality of components.

The apparatus is a software upgrading apparatus on a terminal side. "At least some" is equivalent to "some or all". Optionally, the storage resource feedback information further includes an identifier of each of at least some of the at least two components. The component is a component connected to an internal network (for example, an intra-vehicle network) of the terminal. The at least two components may be all components in the terminal, or may be only some components in the terminal, because there may be a component in which a storage resource has been used up or a component that reserves a storage resource for another operation. The receiving storage resource information of at least two components in a terminal may be performed in one or more receiving manners. The receiving manner includes but is not limited to cellular communication. Wi-Fi (Wireless Fidelity, wireless local area network), WiMAX (Worldwide Interoperability for Microwave Access). Bluetooth (Bluetooth communication technology), ZigBee (ZigBee communication technology), optical communication, satellite communication, infrared communication, transmission line communication, performing receiving through wiring on a hardware interface or a hardware circuit board, obtaining a parameter from a software module, or reading information from a storage device. In addition to the available storage capacity of each of the at least two components, the storage resource information may include other information, for example, a quantity, identifiers, or a total available storage capacity of the at least two components. Not all of the available storage capacities of the at least two components may be placed in the storage resource feedback information because it may be determined, on the terminal side based on the available storage capacity in the storage resource information, that one or more networking modules in the at least two components may not be used to store a terminal software upgrade package. Certainly, the foregoing determining operation may not be performed on the terminal side but on a network side. Because upgrade software may not need to occupy all of the at least two components, the plurality of components may be some of the at least two components. The sending the at least one piece of indication information may be performed in one or more sending manners. The sending manner includes but is not limited to cellular communication, Wi-Fi (Wireless Fidelity, wireless local area network), WiMAX (Worldwide Interoperability for Microwave Access), Bluetooth (Bluetooth communication technology), ZigBee (ZigBee communication technology), optical communication, satellite communication, infrared communication, transmission line communication, performing sending through wiring on a hardware interface or a hardware circuit board, inputting a parameter into the software module, or writing information into the memory. The storage resource information of the terminal is reported to the network-side device, and the network-side device adaptively obtains the plurality of upgrade package blocks through division based on an actual available storage resource in the terminal. This fully utilizes storage resources in the plurality of components in the terminal, and reduces software package storage pressure of the components on the terminal side compared with a conventional technology. In addition, because a relatively large quantity of random storage resources need to be occupied during block division of a relatively large data packet, a requirement for the storage resources in the components on the terminal side can be reduced when block division is performed on an upgrade package on the network side. Finally, a software upgrading success rate can be increased. Therefore, the software upgrading method is more suitable for software upgrading of the terminal (especially an intelligent connected vehicle).

Optionally, the receiving unit includes a plurality of receiving subunits, and the plurality of receiving subunits each are configured to receive storage resource information of at least one of the at least two components in the terminal. Optionally, the plurality of receiving subunits are located in a plurality of different components in the terminal. Optionally, the plurality of receiving subunits receive the storage resource information in at least one receiving manner. The receiving manner includes but is not limited to cellular communication, Wi-Fi (Wireless Fidelity, wireless local area network), WiMAX (Worldwide Interoperability for Microwave Access), Bluetooth (Bluetooth communication technology), ZigBee (ZigBee communication technology), optical communication, satellite communication, infrared communication, transmission line communication, performing receiving through wiring on a hardware interface or a hardware circuit board, obtaining a parameter from a software module, or reading information from a storage device.

Optionally, the storage resource feedback information further includes an identifier of at least one component in a one-to-one correspondence with available storage capacities of at least some of the plurality of components, and the at least one component is some or all of the at least two components.

Optionally, the sending unit includes a plurality of sending subunits, and the plurality of sending subunits are respectively configured to send the at least one piece of indication information to the plurality of components. Optionally, the plurality of sending subunits are located in a plurality of different components in the terminal. Optionally, the plurality of sending subunits send the storage resource information in at least one sending manner, where the sending manner includes but is not limited to cellular communication. Wi-Fi (Wireless Fidelity, wireless local area network), WiMAX (Worldwide Interoperability for Microwave Access), Bluetooth (Bluetooth communication technology), ZigBee (ZigBee communication technology), optical communication, satellite communication, infrared communication, transmission line communication, performing sending through wiring on a hardware interface or a hardware circuit board, inputting a parameter into the software module, or writing information into the memory.

According to the third aspect, in a first possible implementation of the software upgrading apparatus, the upgrade package block information further includes a download address of each of the plurality of upgrade package blocks; and each piece of indication information in the at least one piece of indication information includes a download address of at least one of the plurality of upgrade package blocks. Terminal software may be stored in one device on the network side in a centralized manner, or may be stored in a plurality of devices on the network side in a distributed manner. Therefore, optionally, there are one or more download addresses for the plurality of upgrade package blocks, or at least some of the plurality of upgrade package blocks share one download address. The download address is used to indicate, to a component, a network side device in which an upgrade package block corresponding to the component is located.

According to the third aspect or the first possible implementation of the third aspect, in a second possible implementation of the software upgrading apparatus, the upgrade package block information further includes verification information of each of the plurality of upgrade package blocks, and each piece of indication information in the at least one piece of indication information includes verification information of at least one of the plurality of upgrade package blocks. Each upgrade package block is independently verified, so that a computing resource of a device in the terminal can be further fully utilized. Optionally, the upgrade package block information further includes a quantity of the plurality of upgrade package blocks, and the apparatus further performs a step of performing overall verification based on a verification result of each upgrade package block and the quantity of the plurality of upgrade package blocks.

According to any one of the third aspect or the foregoing implementations of the third aspect, in a third possible implementation of the software upgrading apparatus, the at least one piece of indication information includes an external communication resource used by the plurality of components to obtain at least one of the plurality of upgrade package blocks. The external communication resource is a communication resource used by the components in the terminal to communicate with a device outside the terminal (for example, a cellular communication resource applied to inter-vehicle network communication). The external communication resource includes but is not limited to a communication component, a communication channel, a communication interface, or another communication resource used for cellular communication, satellite communication, Bluetooth communication, Wi-Fi (Wireless Fidelity, wireless local area network), or wired communication. Optionally, the external communication resource includes an external communication resource of each of the plurality of components, or an external communication resource of one or more components other than the plurality of components in the terminal. Optionally, each of the plurality of components obtains one of the plurality of upgrade package blocks by using an external communication resource of the component or by using an external communication resource of the terminal other than the external communication resource of the component.

According to any one of the third aspect or the foregoing implementations of the third aspect, in a fourth possible implementation of the software upgrading apparatus, the at least one piece of indication information includes time information used by the plurality of components to obtain at least one of the plurality of upgrade package blocks. Optionally, the time information indicates that the plurality of components obtain the plurality of upgrade package blocks simultaneously or sequentially. Optionally, the time information indicates that the plurality of components periodically obtain the at least one upgrade package block.

According to any one of the third aspect or the foregoing implementations of the third aspect, in a fifth possible implementation of the software upgrading apparatus, the processing unit is further configured to determine, based on the available storage capacity of each of the at least two components, that an available storage resource in the terminal satisfies a storage requirement for terminal software upgrading. When starting downloading to the terminal device, the network side device sends a storage requirement of a plurality of to-be-downloaded terminal software upgrade packages to the terminal device, and the terminal device determines whether the available storage resource in the terminal satisfies the storage requirement of the plurality of terminal software upgrade packages. In this way, the terminal device has higher autonomy and privacy. Optionally, if a difference obtained by subtracting a sum of storage space occupied by the software upgrade packages from a sum of the available storage capacities exceeds a predetermined threshold, it is determined that the available storage resource in the terminal satisfies the storage requirement for terminal software upgrading.

According to any one of the third aspect or the foregoing implementations of the third aspect, in a sixth possible implementation of the software upgrading apparatus, the at least one piece of indication information is a plurality of pieces of indication information, and the plurality of pieces of indication information are in a one-to-one correspondence with the plurality of components; and the sending the at least one piece of indication information to the plurality of components includes: sending, to each of the plurality of components, one piece of indication information that is in the plurality of pieces of indication information and that corresponds to the component. Optionally, the plurality of pieces of indication information are sent simultaneously or sequentially.

According to any one of the third aspect or the foregoing implementations of the third aspect, in a seventh possible implementation of the software upgrading apparatus, the at least one piece of indication information is one piece of indication information, and the sending the at least one piece of indication information to the plurality of components includes: sending the one piece of indication information to each of the plurality of components. In this manner, the one piece of indication information includes related information used by each of the plurality of components to obtain one of the plurality of upgrade package blocks. Optionally, the one piece of indication information is sent to all of the plurality of components simultaneously or sequentially.

According to any one of the third aspect or the foregoing implementations of the third aspect, in an eighth possible implementation of the software upgrading apparatus, the at least one piece of indication information is one piece of indication information, and the sending the at least one piece of indication information to the plurality of components includes: sending the one piece of indication information to one of the plurality of components. In this manner, the one piece of indication information may be transmitted between the plurality of components.

According to any one of the third aspect or the foregoing implementations of the third aspect, in a ninth possible implementation of the software upgrading apparatus, the sending unit is further configured to send a download instruction to the plurality of components, where the download instruction is used to instruct the plurality of components to obtain the plurality of upgrade package blocks in a one-to-one correspondence with the plurality of components.

According to any one of the third aspect or the foregoing implementations of the third aspect, in a tenth possible implementation of the software upgrading apparatus, the sending unit is further configured to send an upgrade package distribution instruction to the plurality of components, where the upgrade package distribution instruction is used to instruct the plurality of components to send one or more of the plurality of upgrade package blocks to at least one component in the terminal other than the plurality of components, and the one or more upgrade package blocks are obtained by the plurality of components by parsing the plurality of upgrade package blocks in a one-to-one correspondence with the plurality of components.

According to any one of the third aspect or the foregoing implementations of the third aspect, in an eleventh possible implementation of the software upgrading apparatus, the sending unit is further configured to send an installation activation instruction to the plurality of components, where the installation activation instruction is used to instruct to install and activate at least one piece of upgrade software in the plurality of components, and the at least one piece of upgrade software is obtained by the plurality of components by parsing the plurality of upgrade package blocks in a one-to-one correspondence with the plurality of components.

Optionally, the plurality of sending subunits are respectively configured to send the download instruction, the upgrade package distribution instruction, or the installation activation instruction to the plurality of components.

According to any one of the third aspect or the foregoing implementations of the third aspect, in a twelfth possible implementation of the software upgrading apparatus, the available storage capacity includes at least one of an available storage capacity in a random access memory (RAM) or an available storage capacity in a read-only memory (ROM).

According to any one of the third aspect or the foregoing implementations of the third aspect, in a thirteenth possible implementation of the software upgrading apparatus, each of the plurality of upgrade package blocks includes all or some of upgrade software packages used for upgrading at least one component in the terminal.

According to a fourth aspect, a software upgrading apparatus is provided. The software upgrading apparatus is located on a network side and includes: a receiving unit, configured to receive storage resource feedback information from a terminal device, where the storage resource feedback information includes at least an available storage capacity of each of a plurality of components that are in the terminal device and that may be used to store a plurality of upgrade package blocks; a processing unit, configured to divide one or more software upgrade packages into a plurality of upgrade package blocks based on the storage resource feedback information, where the plurality of upgrade package blocks are in a one-to-one correspondence with at least some of the available storage capacities of all the components; where the processing unit is further configured to generate upgrade package block information, where the upgrade package block information includes at least a correspondence between the plurality of upgrade package blocks and the at least some of the available storage capacities of all the components; and a sending unit, configured to send the upgrade package block information to the terminal device. The one or more software upgrade packages are divided into the plurality of upgrade package blocks that are in a one-to-one correspondence with the at least some components. This fully utilizes storage resources in the plurality of components in the terminal, and reduces software package storage pressure of the components on a terminal side compared with a conventional technology. In addition, because a relatively large quantity of random storage resources need to be occupied during block division of a relatively large data packet, a requirement for the storage resources in the components on the terminal side can be reduced when block division is performed on an upgrade package on the network side. Finally, a software upgrading success rate can be increased. Therefore, the software upgrading method is more suitable for software upgrading of the terminal (especially an intelligent connected vehicle).

The receiving unit may receive the storage resource feedback information in one or more receiving manners. The receiving manner includes but is not limited to cellular communication, Wi-Fi (Wireless Fidelity, wireless local area network), WiMAX (Worldwide Interoperability for Microwave Access), Bluetooth (Bluetooth communication technology), ZigBee (ZigBee communication technology), optical communication, satellite communication, infrared communication, transmission line communication, performing receiving through wiring on a hardware interface or a hardware circuit board, obtaining a parameter from a software module, or reading information from a storage device.

Optionally, the receiving unit includes a plurality of receiving subunits, and the plurality of receiving subunits each are configured to receive storage resource information of at least one of the at least two components in the terminal. Optionally, the plurality of receiving subunits are located in a plurality of different components in the terminal. Optionally, the plurality of receiving subunits receive the storage resource information in at least one receiving manner. The receiving manner includes but is not limited to cellular communication, Wi-Fi (Wireless Fidelity, wireless local area network), WiMAX (Worldwide Interoperability for Microwave Access), Bluetooth (Bluetooth communication technology), ZigBee (ZigBee communication technology), optical communication, satellite communication, infrared communication, transmission line communication, performing receiving through wiring on a hardware interface or a hardware circuit board, obtaining a parameter from a software module, or reading information from a storage device.

The sending unit may send the upgrade package block information in one or more sending manners. The sending manner includes but is not limited to cellular communication, Wi-Fi (Wireless Fidelity, wireless local area network), WiMAX (Worldwide Interoperability for Microwave Access), Bluetooth (Bluetooth communication technology), ZigBee (ZigBee communication technology), optical communication, satellite communication, infrared communication, transmission line communication, performing sending through wiring on a hardware interface or a hardware circuit board, inputting a parameter into the software module, or writing information into the memory.

Optionally, the sending unit includes a plurality of sending subunits, and the plurality of sending subunits are respectively configured to send the at least one piece of indication information to the plurality of components. Optionally, the plurality of sending subunits are located in a plurality of different components in the terminal. Optionally, the plurality of sending subunits send the storage resource information in at least one sending manner, where the sending manner includes but is not limited to cellular communication, Wi-Fi (Wireless Fidelity, wireless local area network), WiMAX (Worldwide Interoperability for Microwave Access), Bluetooth (Bluetooth communication technology), ZigBee (ZigBee communication technology), optical communication, satellite communication, infrared communication, transmission line communication, performing sending through wiring on a hardware interface or a hardware circuit board, inputting a parameter into the software module, or writing information into the memory.

Optionally, the dividing one or more software upgrade packages into a plurality of upgrade package blocks includes: performing block division and re-encapsulation on a software upgrade package (for example, a vehicle upgrade package) that occupies a relatively large storage capacity, to obtain a plurality of upgrade package blocks, or performing grouping and re-encapsulation on a plurality of software upgrade packages (for example, one software upgrade package corresponds to one piece of upgrade software) to obtain a plurality of upgrade package blocks. The one or more software upgrade packages are divided into the plurality of upgrade package blocks that are in a one-to-one correspondence with the at least some components. This fully utilizes a storage resource in the terminal, and increases a software upgrading success rate of the terminal. Therefore, the software upgrading apparatus is more suitable for software upgrading of the terminal (especially an intelligent connected vehicle).

According to the fourth aspect, in a first possible implementation of the software upgrading apparatus, the upgrade package block information includes at least one of verification information of each of the plurality of upgrade package blocks, a download address of each upgrade package block, or a quantity of the plurality of upgrade package blocks. The upgrade package block information includes the verification information of each upgrade package block, so that each upgrade package block can be independently verified, thereby fully utilizing computing resources of a plurality of available components in the terminal. The upgrade package block information includes the download address of each upgrade package block, and may indicate, to the plurality of components in the terminal, a network side device configured to obtain the plurality of upgrade package blocks. The upgrade package block information includes the quantity of upgrade package blocks, and may be used to perform overall data integrity verification on the plurality of upgrade package blocks.

According to the fourth aspect or the first possible implementation of the fourth aspect, in a second possible implementation of the software upgrading apparatus, the sending unit is further configured to send a software upgrading starting message to the terminal device. In addition to the network side device, the terminal device may start software upgrading.

According to any one of the fourth aspect or the foregoing implementations of the fourth aspect, in a third possible implementation of the software upgrading apparatus, the processing unit is further configured to determine, based on the storage resource feedback information, that an available storage resource in the terminal device satisfies a storage requirement for software upgrading. Optionally, if a difference obtained by subtracting a sum of storage space occupied by software upgrade packages from a sum of the available storage capacities exceeds a predetermined threshold, it is determined that the available storage resource in the terminal device satisfies the storage requirement for software upgrading.

According to any one of the fourth aspect or the foregoing implementations of the fourth aspect, in a fourth possible implementation of the software upgrading apparatus, the dividing one or more software upgrade packages into a plurality of upgrade package blocks includes: preferably determining a software upgrade package that occupies relatively large storage space as an upgrade package block corresponding to a component that has a relatively large available storage capacity. The plurality of upgrade package blocks are in a one-to-one correspondence with the plurality of components. In this manner, a case in which a software upgrade package cannot be determined as any one of the plurality of upgrade package blocks because the software upgrade package is excessively large can be avoided as much as possible.

According to any one of the fourth aspect or the foregoing implementations of the fourth aspect, in a fifth possible implementation of the software upgrading apparatus, the sending unit is further configured to send an upgrade package distribution instruction to at least one upgrade software storage apparatus on the network side, where the upgrade package distribution instruction is used to instruct the at least one upgrade software storage apparatus on the network side to send at least one of the plurality of upgrade package blocks to the terminal device.

According to any one of the fourth aspect or the foregoing implementations of the fourth aspect, in a sixth possible implementation of the software upgrading apparatus, the sending unit is further configured to send at least one of the plurality of upgrade package blocks to the terminal device.

According to the sixth possible implementation of the fourth aspect, in a seventh possible implementation of the software upgrading apparatus, the receiving unit is further configured to receive the at least one of the plurality of upgrade package blocks from the at least one upgrade software storage apparatus on the network side.

According to any one of the fourth aspect or the foregoing implementations of the fourth aspect, in an eighth possible implementation of the software upgrading apparatus, the available storage capacity includes at least one of an available storage capacity in a random access memory (RAM) or an available storage capacity in a read-only memory (ROM).

According to any one of the fourth aspect or the foregoing implementations of the fourth aspect, in a ninth possible implementation of the software upgrading apparatus, each of the plurality of upgrade package blocks includes all or some of upgrade software packages used for upgrading at least one component in the terminal.

According to a fifth aspect, a software upgrading apparatus is provided. The apparatus includes a memory and a processor. The memory stores computer program instructions, and the processor runs the computer program instructions to perform the operation in any one of the first aspect or the foregoing implementations of the first aspect.

According to the fifth aspect, in a first possible implementation of the software upgrading apparatus, the apparatus further includes a transceiver, configured to receive the storage resource information or the upgrade package block information, or configured to send at least one of the storage resource feedback information, the at least one piece of indication information, the download instruction, the upgrade package distribution instruction, and the installation activation instruction.

The software upgrading apparatus described in any one of the third or fifth aspect or the foregoing implementations of the third or fifth aspect may be applied to a terminal device including but not limited to an intelligent connected vehicle, a robot, a smart household device, or another form. When being applied to an intelligent connected vehicle, the software upgrading apparatus may be the intelligent connected vehicle itself or a component in the intelligent connected vehicle, for example, a central gateway, a T-box (Telematics BOX, vehicle communication terminal in the Internet of vehicles), a human-machine interaction (HMI) controller, a mobile data center (MDC, Mobile Data Controller), an advanced driver assistant system (ADAS, Advanced Driving Assistant System), or an electronic control unit (ECU). Alternatively, the software upgrading apparatus may be a sub-apparatus in the foregoing components, or may be an independent apparatus in the intelligent connected vehicle other than the foregoing components.

According to a sixth aspect, a software upgrading apparatus is provided. The apparatus includes a memory and a processor. The memory stores computer program instructions, and the processor runs the computer program instructions to perform the operation in any one of the second aspect or the foregoing implementations of the second aspect.

According to the sixth aspect, in a first possible implementation of the software upgrading apparatus, the apparatus further includes a transceiver, configured to receive the storage resource feedback information or at least one of the plurality of upgrade package blocks, or configured to send at least one of the upgrade package block information, the software upgrading starting message, the upgrade package distribution instruction, and the at least one upgrade package block.

The software upgrading apparatus described in any one of the fourth or sixth aspect or the foregoing implementations of the fourth or sixth aspect may be applied to a network side. For example, the software upgrading apparatus exists in a form of a server on the network side.

According to a seventh aspect, a terminal software upgrading system is provided. The system includes the software upgrading apparatus according to any one of the third aspect or the foregoing implementations of the third aspect and the software upgrading apparatus according to any one of the fourth aspect or the foregoing implementations of the fourth aspect.

According to an eighth aspect, a terminal software upgrading system is provided. The system includes the software upgrading apparatus according to any one of the fifth aspect or the foregoing implementations of the fifth aspect and the software upgrading apparatus according to any one of the sixth aspect or the foregoing implementations of the sixth aspect.

According to a ninth aspect, a computer storage medium is provided. The computer storage medium includes computer instructions. When the computer instructions are run by a processor, a software upgrading apparatus is enabled to perform the method according to any one of the first aspect or the foregoing implementations of the first aspect.

According to a tenth aspect, a computer storage medium is provided. The computer storage medium includes computer instructions. When the computer instructions are run by a processor, a software upgrading apparatus is enabled to perform the method according to any one of the second aspect or the foregoing implementations of the second aspect.

According to an eleventh aspect, a computer program product is provided. When the computer program product runs on a processor, a software upgrading apparatus is enabled to perform the method according to any one of the first aspect or the foregoing implementations of the first aspect.

According to a twelfth aspect, a computer program product is provided. When the computer program product runs on a processor, a software upgrading apparatus is enabled to perform the method according to any one of the second aspect or the foregoing implementations of the second aspect.

According to a thirteenth aspect, a vehicle software upgrading method is provided. The method includes: receiving storage resource information of at least two components in a vehicle, where the storage resource information includes at least an available storage capacity of each of the at least two components; and sending at least one piece of indication information to the plurality of components in the vehicle, where the at least one piece of indication information is used to indicate the plurality of components to obtain a plurality of upgrade package blocks, the plurality of upgrade package blocks are obtained based on the storage resource information by dividing one or more upgrade software packages, and the plurality of components are in a one-to-one correspondence with at least some of the available storage capacities of the at least two components.

According to a fourteenth aspect, a vehicle software upgrading apparatus is provided. The apparatus includes: a receiving unit, configured to receive storage resource information of at least two components in a vehicle, where the storage resource information includes at least an available storage capacity of each of the at least two components; and a sending unit, configured to send at least one piece of indication information to a plurality of components in the vehicle, where the at least one piece of indication information is used to indicate the plurality of components to obtain a plurality of upgrade package blocks, the plurality of upgrade package blocks are obtained based on the storage resource information by dividing one or more upgrade software packages, and the plurality of components are in a one-to-one correspondence with at least some of the available storage capacities of the at least two components.

According to a fifteenth aspect, a vehicle software upgrading method is provided. The method includes: sending storage resource feedback information in a vehicle to a network side device, where the storage resource feedback information includes at least an available storage capacity of each of at least two components in the vehicle; and receiving, from the network side device, upgrade package block information generated by the network side device, where the upgrade package block information includes at least a one-to-one correspondence between a plurality of upgrade package blocks for vehicle software upgrading and at least some of the available storage capacities of all the components.

According to a sixteenth aspect, a vehicle software upgrading apparatus is provided. The apparatus includes: a sending unit, configured to send storage resource feedback information in a vehicle to a network side device, where the storage resource feedback information includes at least an available storage capacity of each of at least two components in the vehicle; and a receiving unit, configured to receive, from the network side device, upgrade package block information generated by the network side device, where the upgrade package block information includes at least a one-to-one correspondence between a plurality of upgrade package blocks for vehicle software upgrading and at least some of the available storage capacities of all the components.

According to a seventeenth aspect, a vehicle software upgrading method is provided. The method includes: receiving storage resource feedback information from a vehicle, where the storage resource feedback information includes at least an available storage capacity of each of a plurality of components that are in the vehicle and that may be used to store a plurality of upgrade package blocks; and sending upgrade package block information to a terminal device, where the upgrade package block information includes at least a one-to-one correspondence between a plurality of upgrade package blocks and at least some of the available storage capacities of all the components.

According to an eighteenth aspect, a vehicle software upgrading apparatus is provided. The apparatus includes: a receiving unit, configured to receive storage resource feedback information from a vehicle, where the storage resource feedback information includes at least an available storage capacity of each of a plurality of components that are in the vehicle and that may be used to store a plurality of upgrade package blocks; and a sending unit, configured to send upgrade package block information to a terminal device, where the upgrade package block information includes at least a one-to-one correspondence between a plurality of upgrade package blocks and at least some of the available storage capacities of all the components.

DESCRIPTION OF EMBODIMENTS

To make the objectives, technical solutions, and advantages of embodiments of the present application clearer, the following clearly describes the technical solutions in embodiments of the present application with reference to the accompanying drawings in embodiments of the present application. It is clearly that the described embodiments are some but not all of embodiments of the present application. All other embodiments obtained by a person of ordinary skill in the art based on embodiments of the present application without creative efforts shall fall within the protection scope of the present application.

Figure 1:
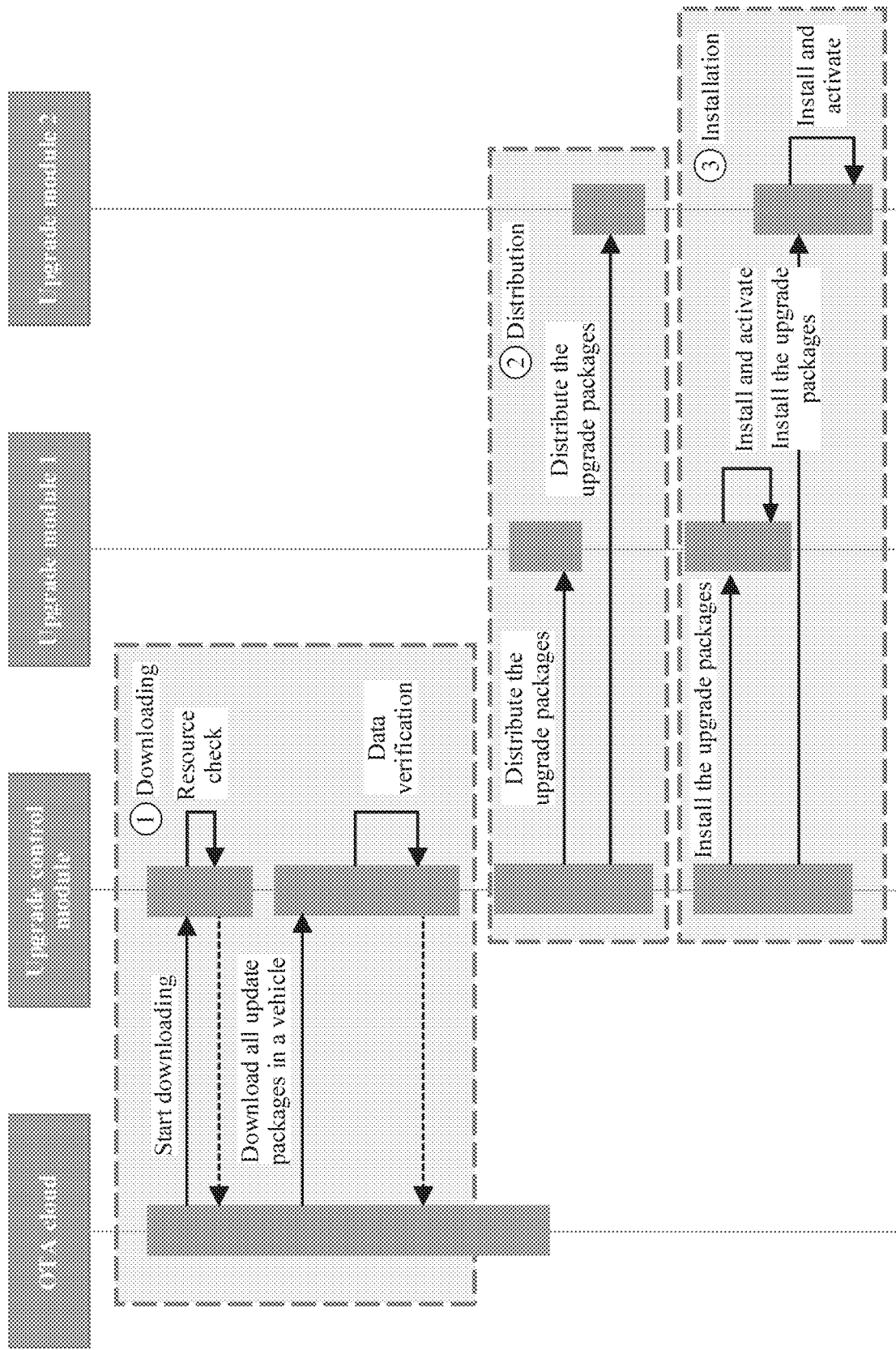
FIG. 1 is a flowchart of a software upgrading method used when there are sufficient storage resources in a conventional technology.
Figure 2:
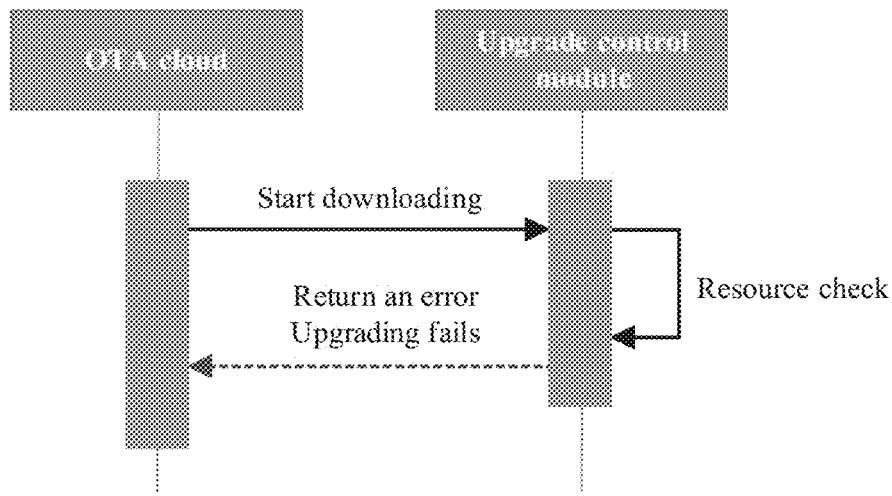
FIG. 2 is a flowchart of a software upgrading method used when there are insufficient storage resources in a conventional technology.
Figure 3:
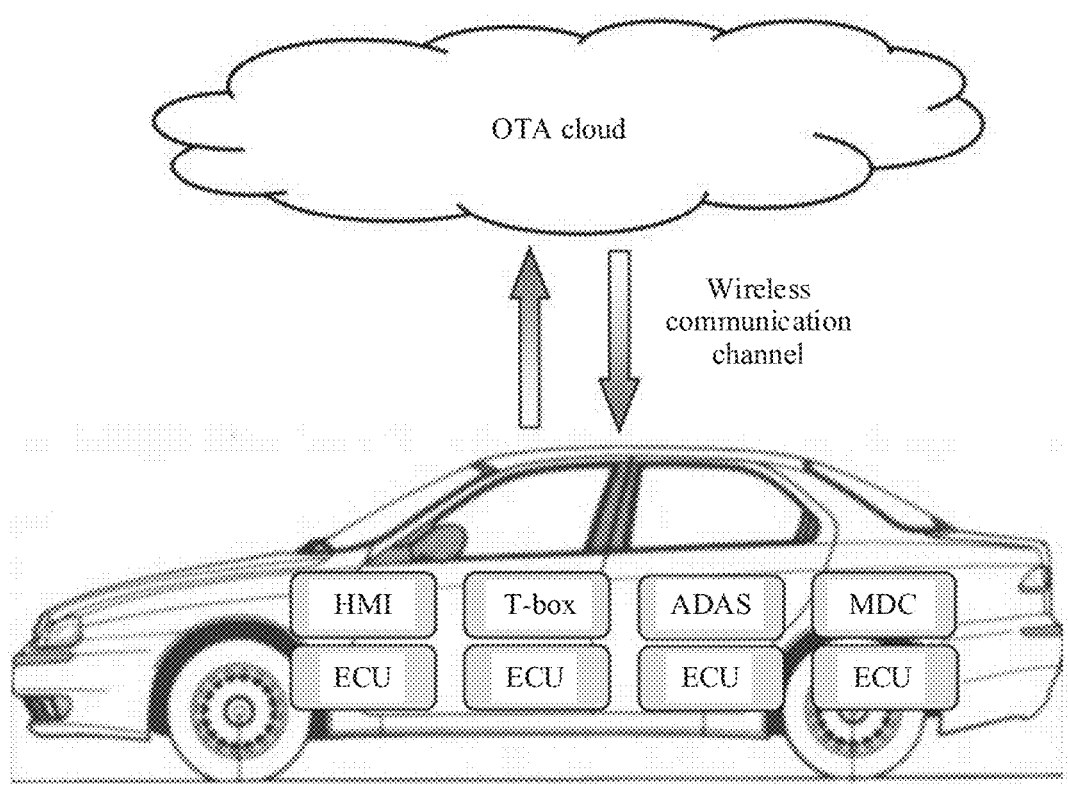
FIG. 3 is a schematic diagram of a typical application scenario of the present application.

Embodiments of the present application may be applied to an application scenario of upgrading a plurality of components in a terminal (including but not limited to an intelligent connected vehicle, a robot, or a smart household device). FIG. 3 is a schematic diagram of a typical application scenario of the present application. An intelligent connected vehicle is connected to an OTA cloud through a wireless communication channel to upload or download a message and data related to vehicle software upgrading. The wireless communication channel includes but is not limited to a wireless communication channel in a form of 2G (2nd generation mobile communication technology), 3G (3rd generation mobile communication technology), 4G (4th generation mobile communication technology), 5G (5th generation mobile communication technology), Wi-Fi (Wireless Fidelity, wireless local area network), WiMAX (Worldwide Interoperability for Microwave Access), Bluetooth (Bluetooth communication technology), ZigBee (ZigBee communication technology), optical transmission, satellite communication, or infrared communication. Components in the intelligent connected vehicle include a central gateway, a T-box (Telematics BOX, vehicle communication terminal in the Internet of vehicles), a human-machine interaction (HMI) controller, a mobile data center (MDC, Mobile Data Controller), an advanced driver assistant system (ADAS, Advanced Driving Assistant System), a plurality of electronic control units (ECU), and another component.

Figure 4:
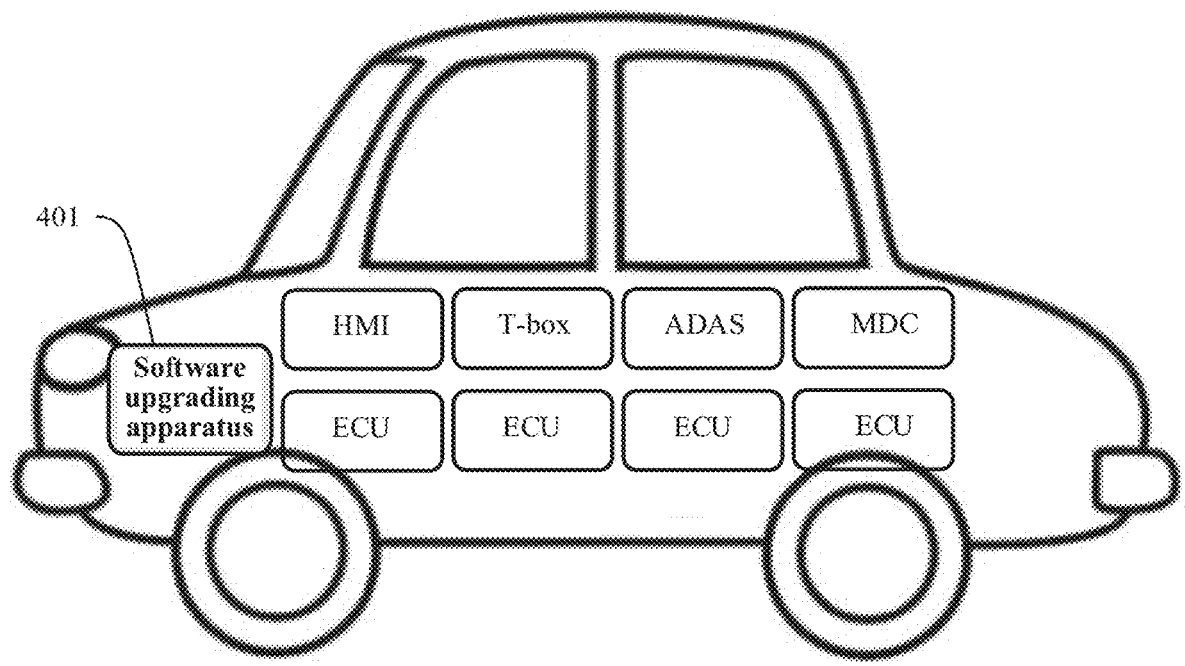
FIG. 4 is a schematic diagram of a first existence form of a software upgrading apparatus on a terminal side according to an embodiment of the present application.

An application scenario of an intelligent connected vehicle is used as an example below to describe four typical existence forms (an actual case is not limited to the four typical existence forms) of a software upgrading apparatus on a terminal side provided in embodiments of the present application, including the following forms:

In a first form, the software upgrading apparatus may exist in an intelligent connected vehicle as an independent component (refer to a software upgrading apparatus 401 in FIG. 4), has both an inter-vehicle network communication function and an intra-vehicle network communication function, and is configured to exchange signaling or data with a network side device and coordinate with another component in the vehicle to store, distribute, install, or activate upgrade software. In addition, the software upgrading apparatus 401 may also be a component that is in the vehicle and that needs to be upgraded, and receives a software upgrade package from the network side device and stores the software upgrade package.

Figure 5:
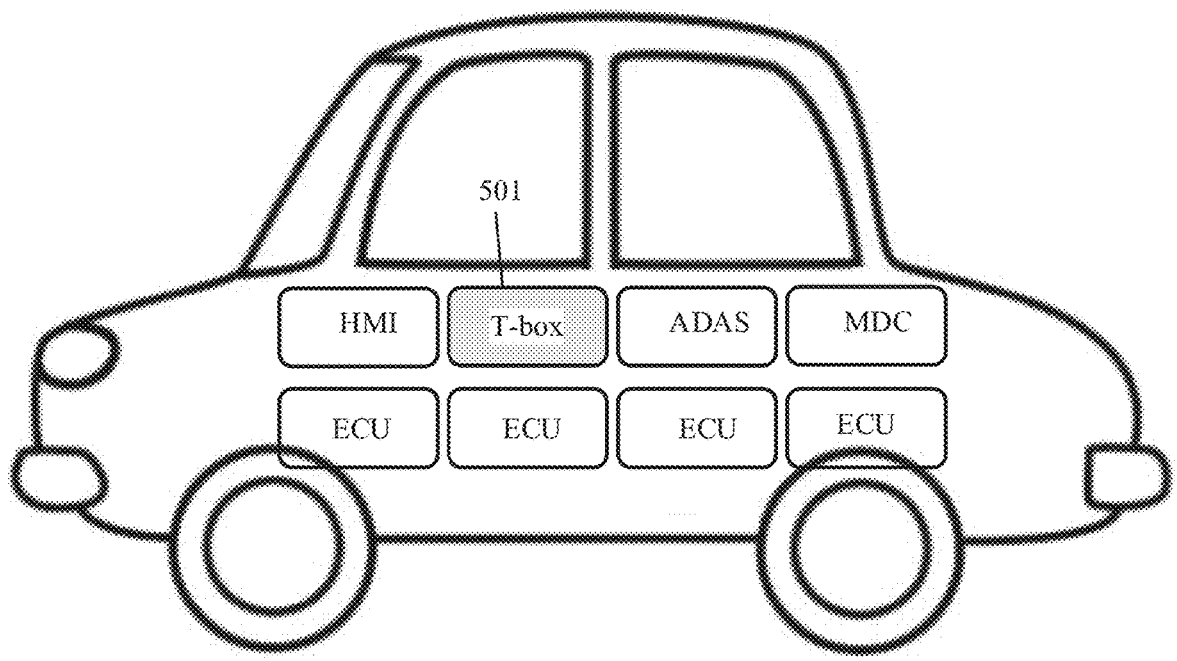
FIG. 5 is a schematic diagram of second and third existence forms of a software upgrading apparatus on a terminal side according to an embodiment of the present application.

In a second form and a third form, the software upgrading apparatus may be a conventional component (for example, a T-box 501 in FIG. 5) in an intelligent connected vehicle or a sub-apparatus in the conventional component, has both an inter-vehicle network communication function and an intra-vehicle network communication function, and is configured to exchange signaling or data with the network side device and coordinate with another component in the vehicle to store, distribute, install, or activate upgrade software. In addition, the T-box 501 in this case may also be a component that is in the vehicle and that needs to be upgraded, and receives a software upgrade package from the network side device and stores the software upgrade package.

Figure 6:
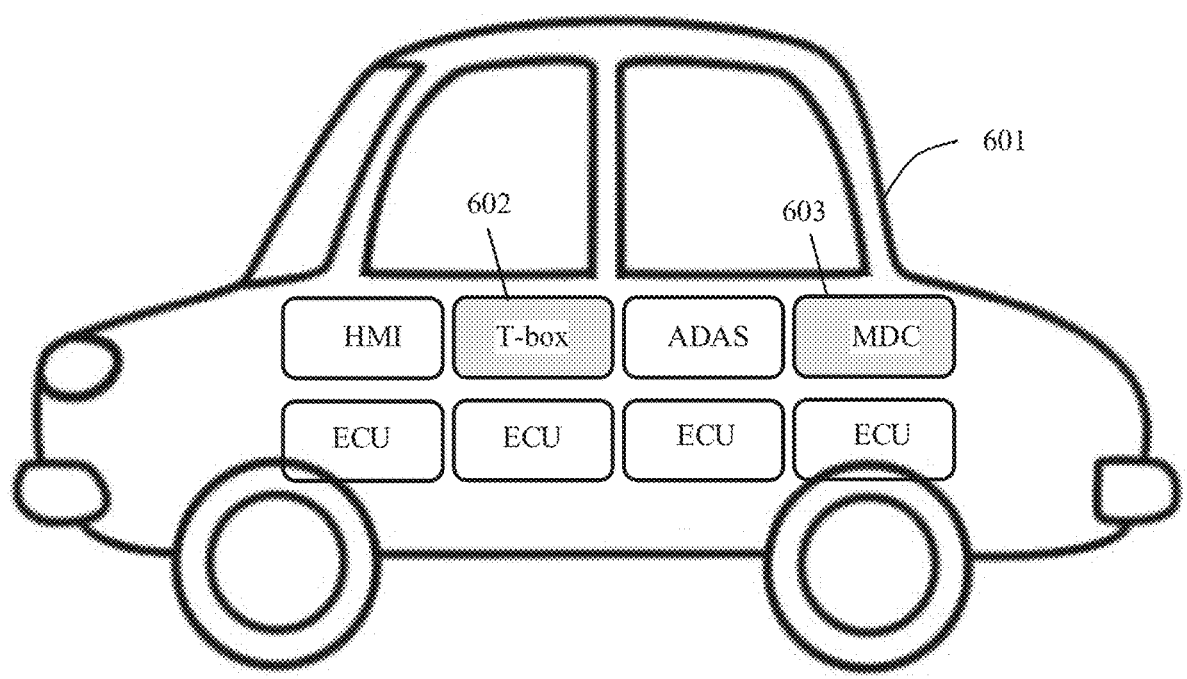
FIG. 6 is a schematic diagram of a fourth existence form of a software upgrading apparatus on a terminal side according to an embodiment of the present application.

In a fourth form, the software upgrading apparatus may be an intelligent connected vehicle (for example, an intelligent connected vehicle 601 in FIG. 6), and completes, in cooperation with a plurality of components (for example, a T-box 602 and an MDC 603 in FIG. 6) in the intelligent connected vehicle, a software upgrading method that is performed on a terminal side and that is provided in embodiments of the present application. For example, the MDC 603 does not have an inter-vehicle network communication function, exchanges signaling or data with the network side device by using the T-box 602, and coordinates, by using an intra-vehicle network communication function of the MDC 603, with another component in the vehicle to store, distribute, install, or activate upgrade software.

Figure 7:
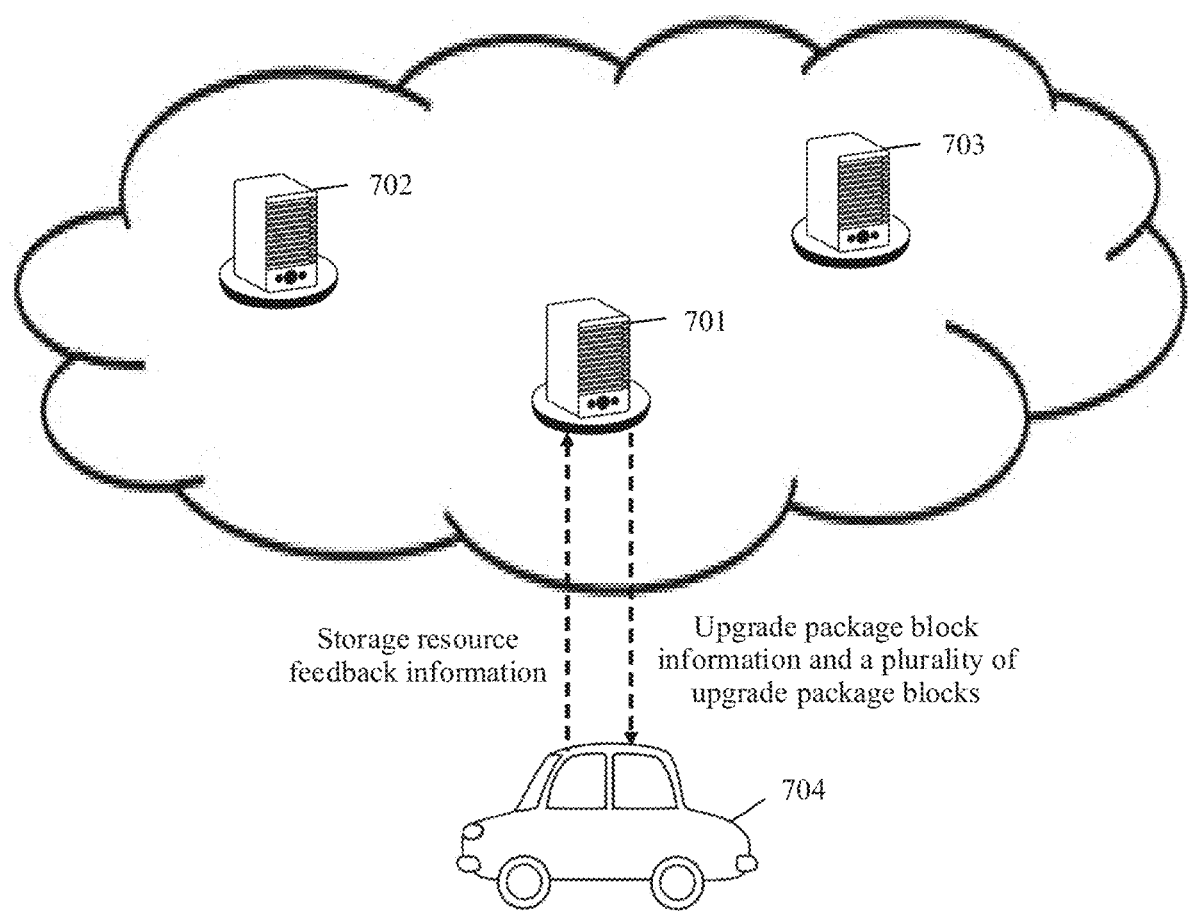
FIG. 7 is a schematic diagram of a first operation mode of a software upgrading apparatus on a network side according to an embodiment of the present application.

An application scenario of an intelligent connected vehicle is used as an example below to describe five typical operation modes (an actual case is not limited to the five typical operation modes) of a software upgrading apparatus on a network side provided in embodiments of the present application, including the following modes:

In a first mode (refer to FIG. 7), all upgrade package blocks used for software upgrading of a component in an intelligent connected vehicle 704 are stored in a server 701 on a network side in a centralized manner, and the server 701 is the software upgrading apparatus on the network side provided in embodiments of the present application. The server 701 receives storage resource feedback information from the intelligent connected vehicle 704, and sends upgrade package block information and each of a plurality of upgrade package blocks to the intelligent connected vehicle 704.

Figure 8:
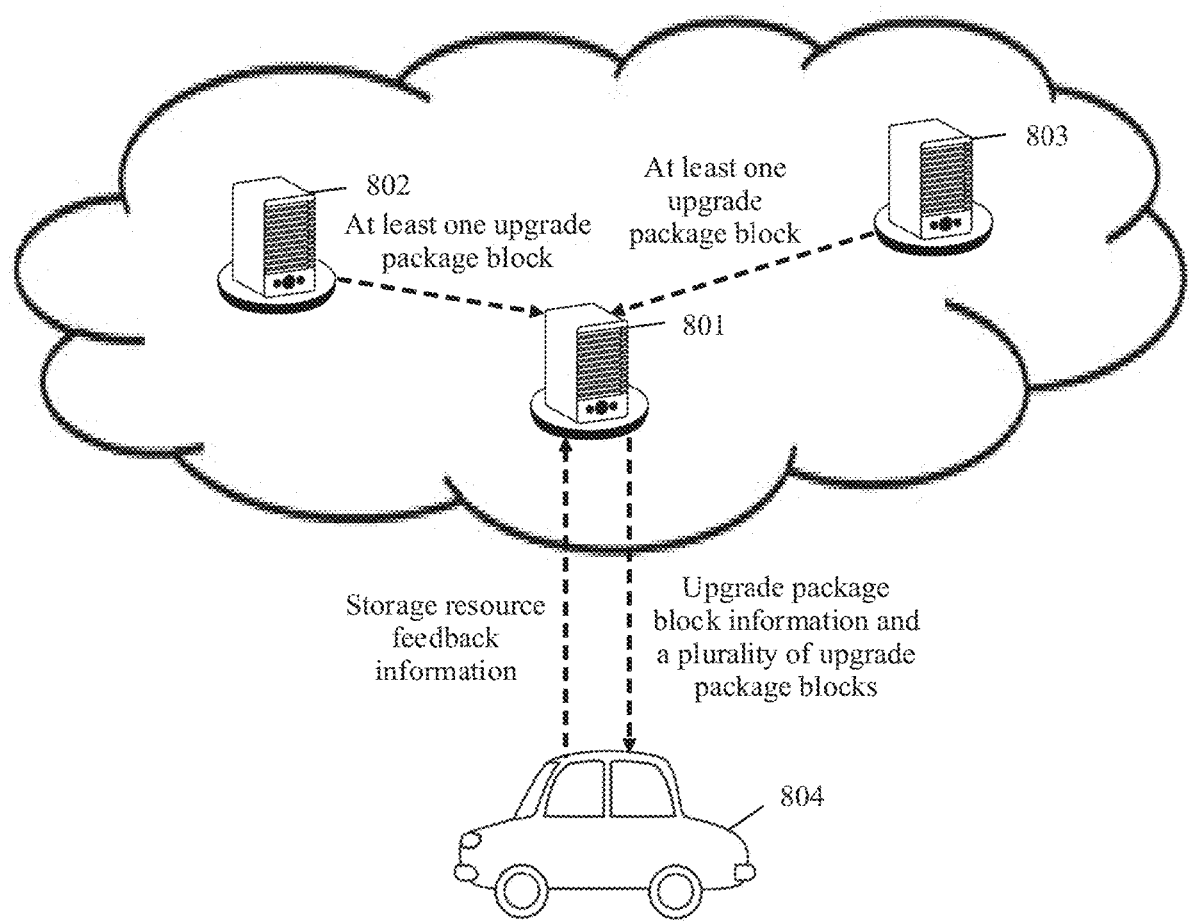
FIG. 8 is a schematic diagram of a second operation mode of a software upgrading apparatus on a network side according to an embodiment of the present application.

In a second mode (refer to FIG. 8), a server 801 is the software upgrading apparatus on a network side provided in embodiments of the present application, and a plurality of upgrade package blocks used for software upgrading of a component in an intelligent connected vehicle 804 are stored in a plurality of servers (including, for example, a server 802 and a server 803, and may or may not include a server 801) on a network side in a distributed manner. The server 801 receives storage resource feedback information from the intelligent connected vehicle 804, receives at least one upgrade package block from each of the server 802 and the server 803, and sends upgrade package block information and each of a plurality of upgrade package blocks to the intelligent connected vehicle 804.

Figure 9:
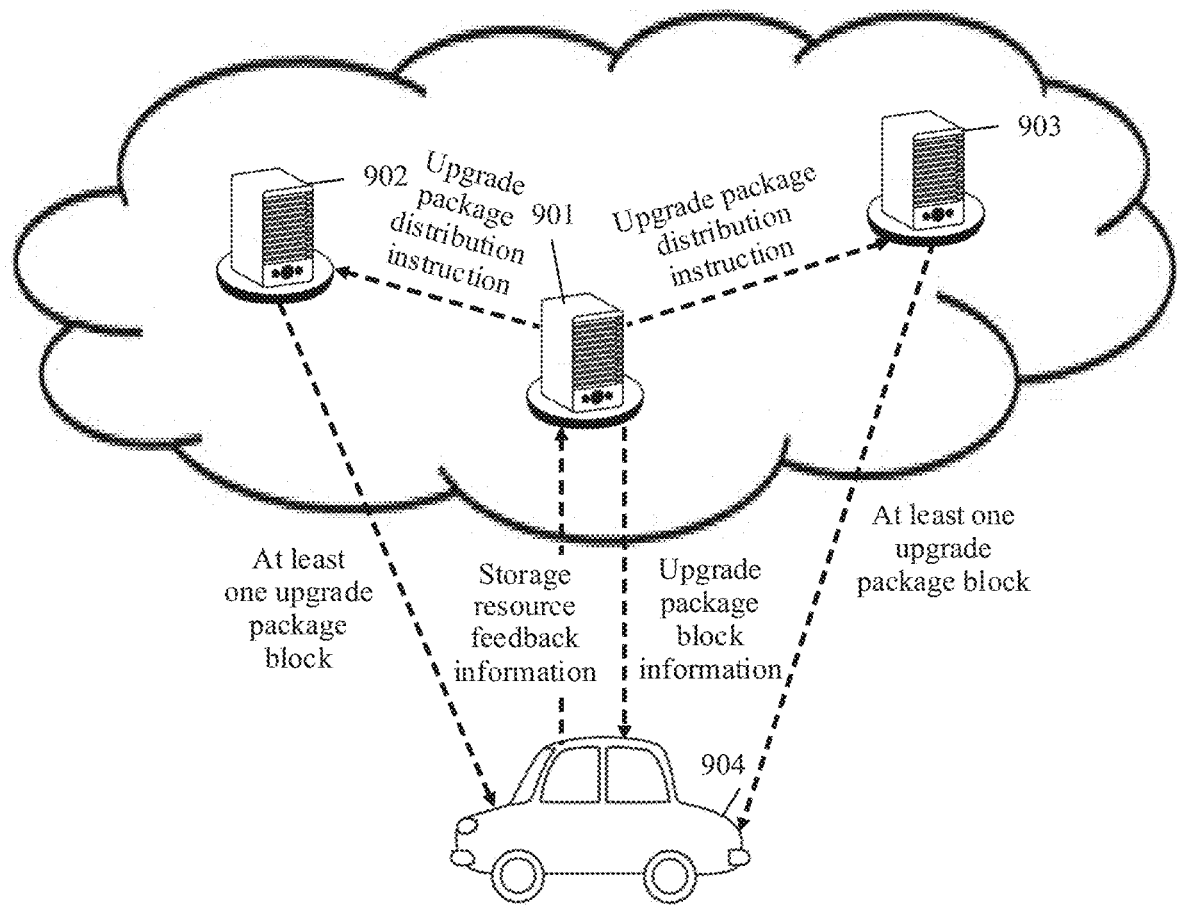
FIG. 9 is a schematic diagram of a third operation mode of a software upgrading apparatus on a network side according to an embodiment of the present application.

In a third mode (refer to FIG. 9), a server 901 is the software upgrading apparatus on a network side provided in embodiments of the present application, and a plurality of upgrade package blocks used for software upgrading of a component in an intelligent connected vehicle 904 are stored in a plurality of servers (including, for example, a server 902 and a server 903, but not including a server 901) on a network side in a distributed manner. The server 901 receives storage resource feedback information from the intelligent connected vehicle 904, and sends upgrade package block information to the intelligent connected vehicle 804. After receiving an upgrade package distribution instruction sent by the server 901, the server 902 and the server 903 respectively send, to the intelligent connected vehicle 904, at least one upgrade package block stored in the server 902 and at least one upgrade package block stored in the server 903.

Figure 10:
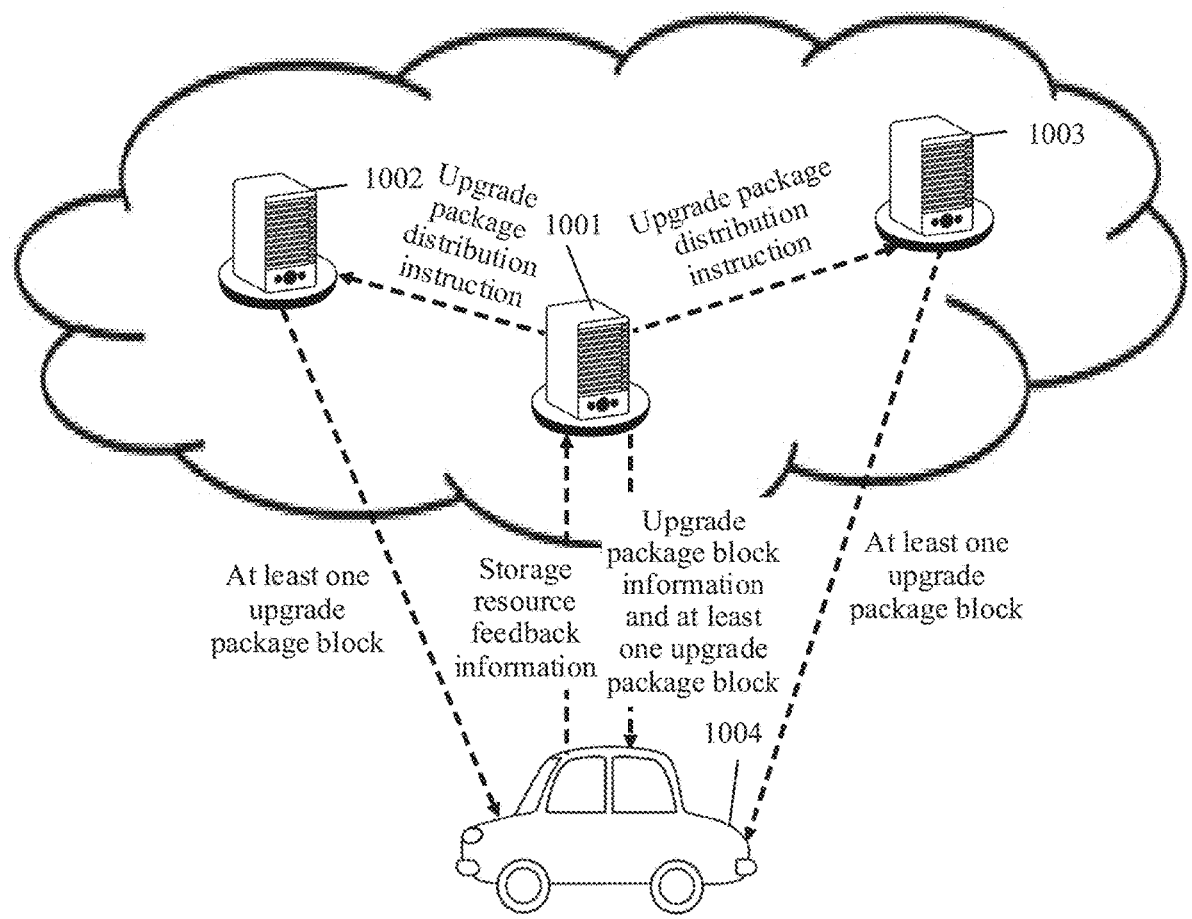
FIG. 10 is a schematic diagram of a fourth operation mode of a software upgrading apparatus on a network side according to an embodiment of the present application.

In a fourth mode (refer to FIG. 10), a server 1001 is the software upgrading apparatus on a network side provided in embodiments of the present application, and a plurality of upgrade package blocks used for software upgrading of a component in an intelligent connected vehicle 1004 are stored in a plurality of servers (including, for example, a server 1002, a server 1003, and a server 1001) on a network side in a distributed manner. The server 1001 receives storage resource feedback information from the intelligent connected vehicle 1004, and sends upgrade package block information to the intelligent connected vehicle 1004. After receiving an upgrade package distribution instruction sent by the server 1001, the server 1002 and the server 1003 respectively send, to the intelligent connected vehicle 1004, at least one upgrade package block stored in the server 1002 and at least one upgrade package block stored in the server 1003. The server 1001 also sends, to the intelligent connected vehicle 1004, at least one upgrade package block stored in the server 1001.

Figure 11:
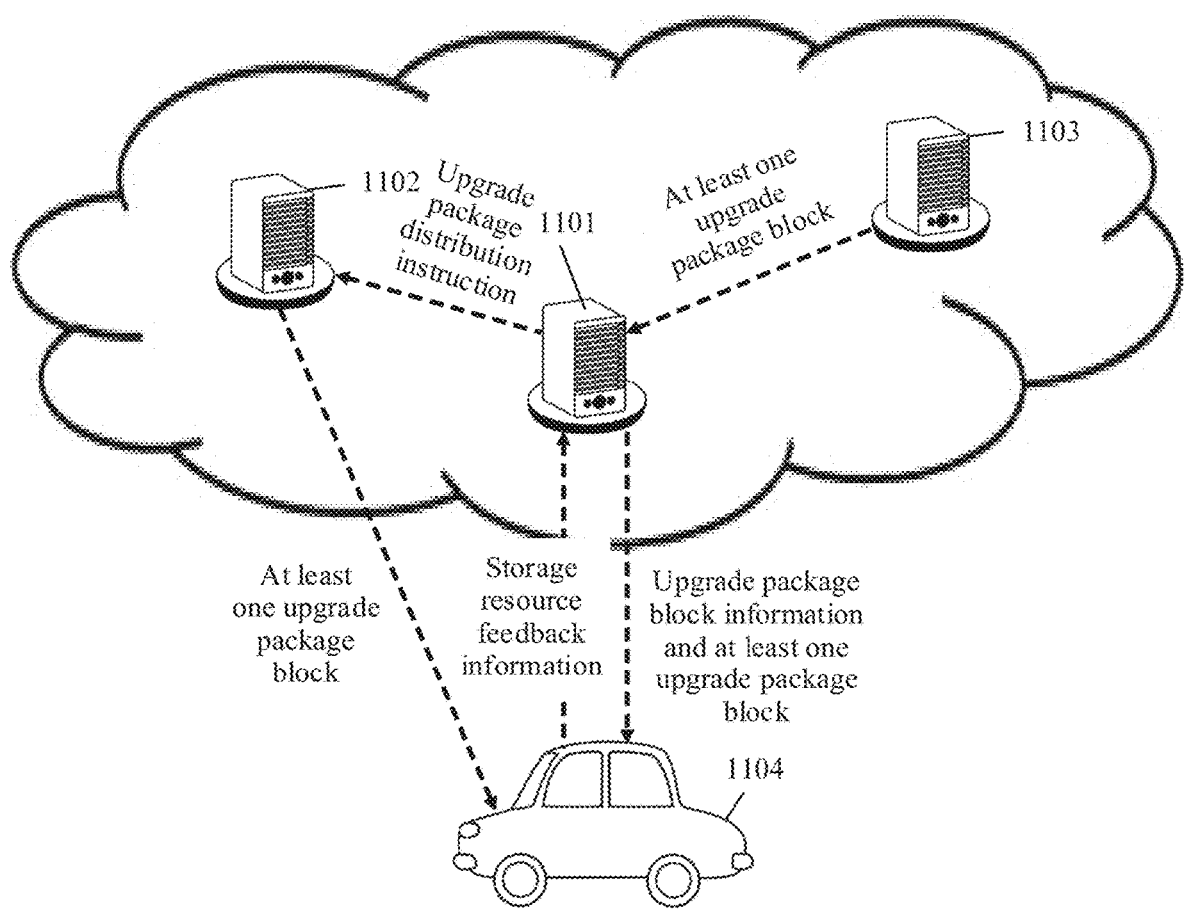
FIG. 11 is a schematic diagram of a fifth operation mode of a software upgrading apparatus on a network side according to an embodiment of the present application.

In a fifth mode (refer to FIG. 11), a server 1101 is the software upgrading apparatus on a network side provided in embodiments of the present application, and a plurality of upgrade package blocks used for software upgrading of a component in an intelligent connected vehicle 1104 are stored in a plurality of servers (including, for example, a server 1102 and a server 1103, and may or may not include a server 1101) on a network side in a distributed manner. The server 1101 receives storage resource feedback information from the intelligent connected vehicle 1104, and sends upgrade package block information to the intelligent connected vehicle 1104. After receiving an upgrade package distribution instruction sent by the server 1101, the server 1102 sends, to the intelligent connected vehicle 1104, at least one upgrade package block stored in the server 1102. The server 1103 sends, to the server 1101, at least one upgrade package block stored in the server 1103. The server 1101 sends at least one upgrade package block (including the at least one upgrade package block stored in server 1103) to the intelligent connected vehicle 1104.

Figure 12A:
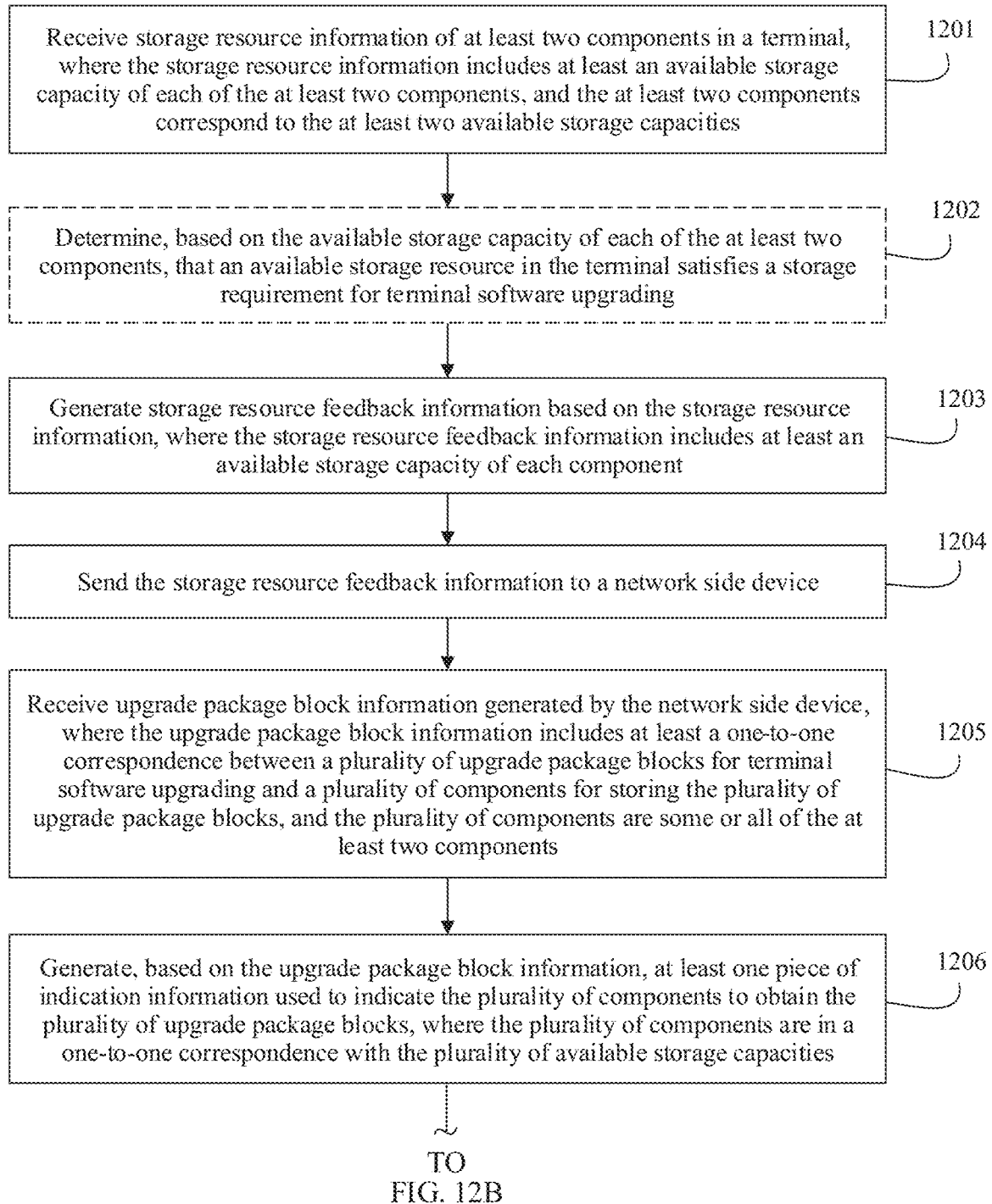
FIG. 12A and FIG. 12B are a flowchart of a software upgrading method performed on a terminal side according to Embodiment 1 of the present application.
Figure 12B:
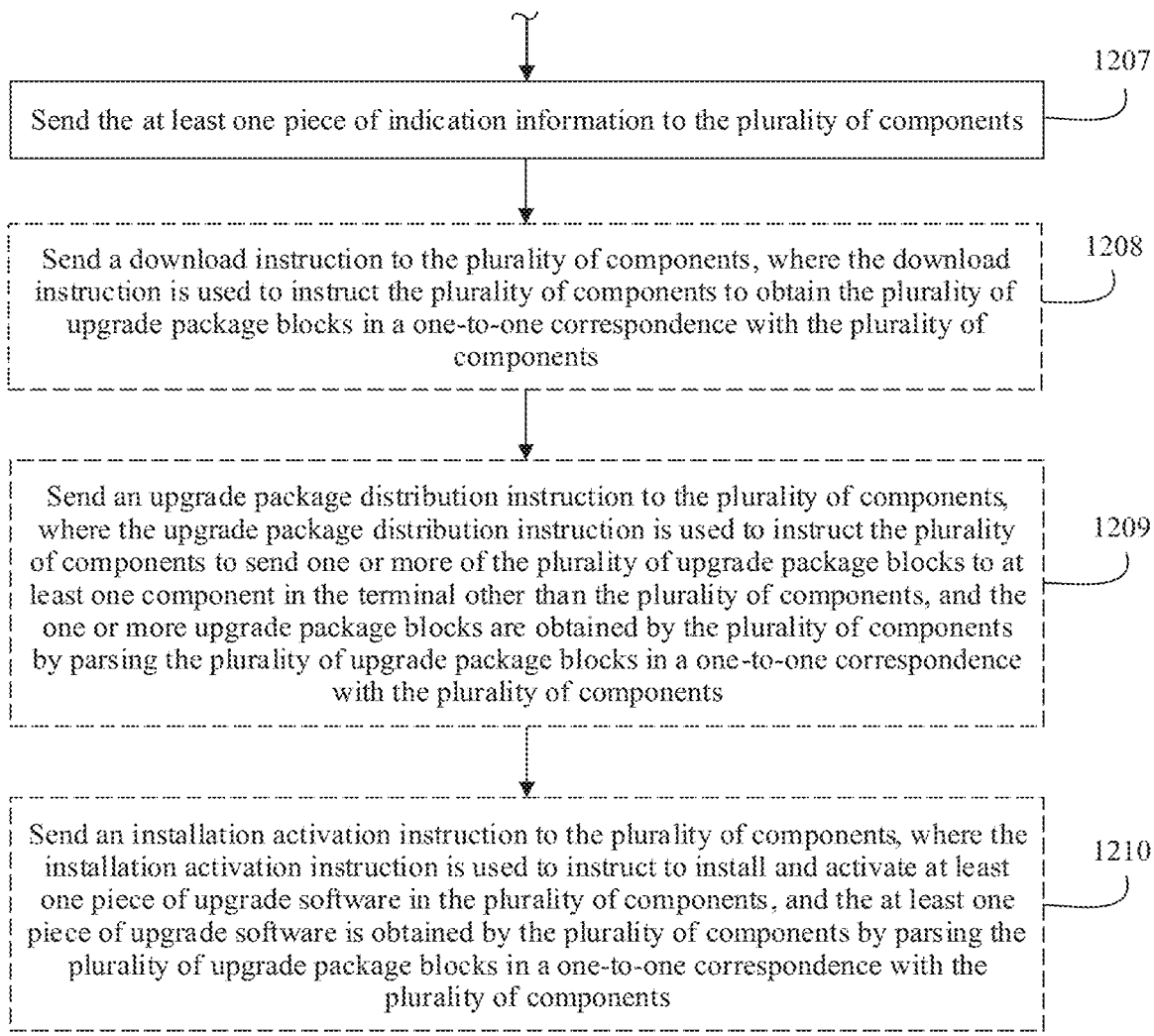

Embodiment 1 of the present application provides a software upgrading method performed on a terminal side. The method is performed by a software upgrading apparatus on a terminal side (for example, the software upgrading apparatus 401, the T-box 501, a sub-apparatus in the T-box 501, or the intelligent connected vehicle 601 described above). As shown in FIG. 12A and FIG. 12B, the method includes the following steps.

Step 1201: Receive storage resource information of at least two components in a terminal, where the storage resource information includes at least an available storage capacity of each of the at least two components, and the at least two components correspond to the at least two available storage capacities.

Optionally, Embodiment 1 of the present application includes step 1202: Determine, based on the available storage capacity of each of the at least two components, that an available storage resource in the terminal satisfies a storage requirement for terminal software upgrading.

Step 1203: Generate storage resource feedback information based on the storage resource information, where the storage resource feedback information includes at least an available storage capacity of each component.

Step 1204: Send the storage resource feedback information to a network side device.

Step 1205: Receive upgrade package block information generated by the network side device, where the upgrade package block information includes at least a one-to-one correspondence between a plurality of upgrade package blocks for terminal software upgrading and a plurality of components for storing the plurality of upgrade package blocks, and the plurality of components are some or all of the at least two components.

Step 1206: Generate, based on the upgrade package block information, at least one piece of indication information used to indicate the plurality of components to obtain the plurality of upgrade package blocks, where the plurality of components are in a one-to-one correspondence with the plurality of available storage capacities.

Step 1207: Send the at least one piece of indication information to the plurality of components.

Optionally, Embodiment 1 of the present application includes step 1208: Send a download instruction to the plurality of components, where the download instruction is used to instruct the plurality of components to obtain the plurality of upgrade package blocks in a one-to-one correspondence with the plurality of components.

Optionally, Embodiment 1 of the present application includes step 1209: Send an upgrade package distribution instruction to the plurality of components, where the upgrade package distribution instruction is used to instruct the plurality of components to send one or more of the plurality of upgrade package blocks to at least one component in the terminal other than the plurality of components, and the one or more upgrade package blocks are obtained by the plurality of components by parsing the plurality of upgrade package blocks in a one-to-one correspondence with the plurality of components.

Optionally, Embodiment 1 of the present application includes step 1210: Send an installation activation instruction to the plurality of components, where the installation activation instruction is used to instruct to install and activate at least one piece of upgrade software in the plurality of components, and the at least one piece of upgrade software is obtained by the plurality of components by parsing the plurality of upgrade package blocks in a one-to-one correspondence with the plurality of components.

Figure 13A:
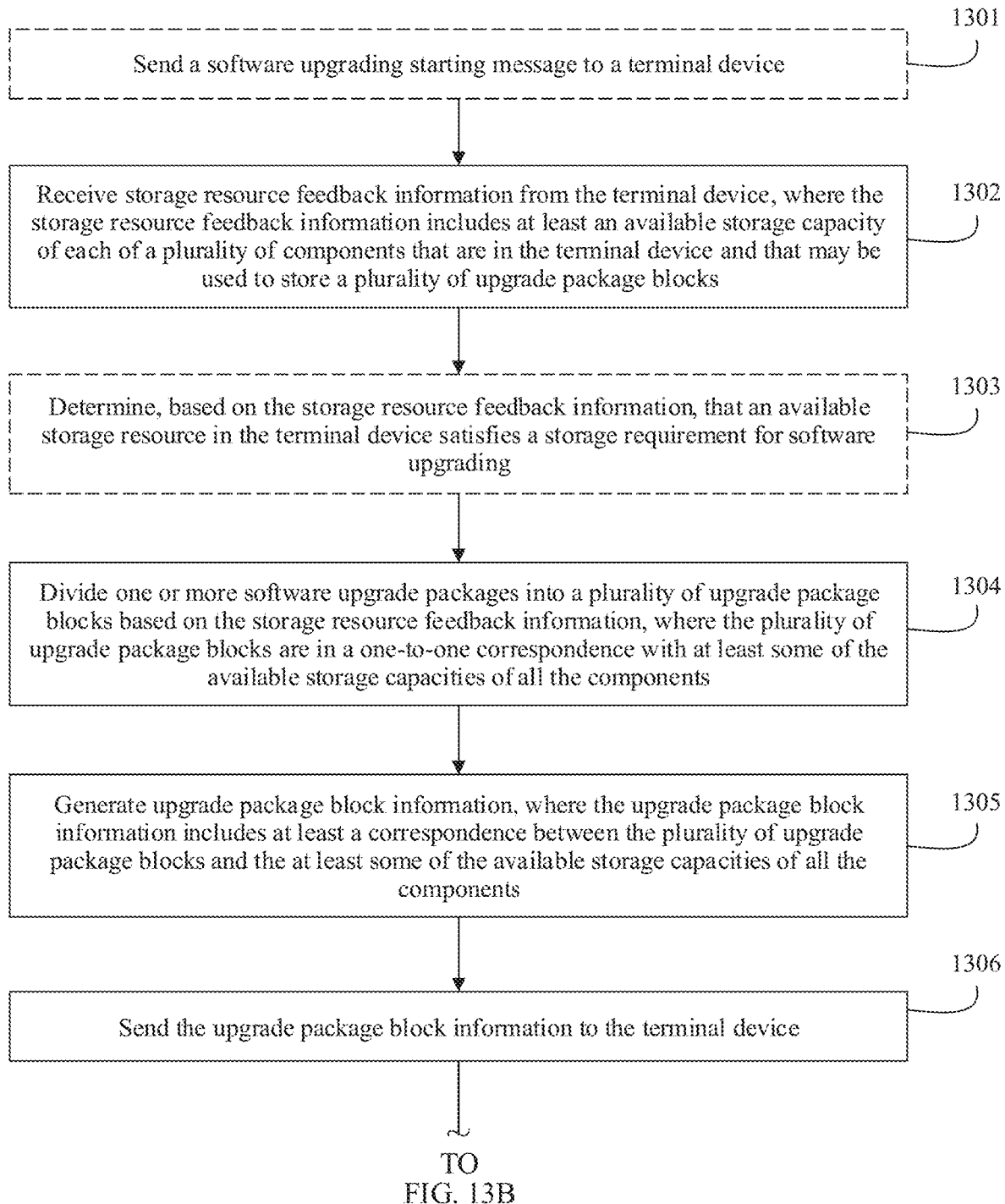
FIG. 13A and FIG. 13B are a flowchart of a software upgrading method performed on a network side according to Embodiment 2 of the present application.
Figure 13B:
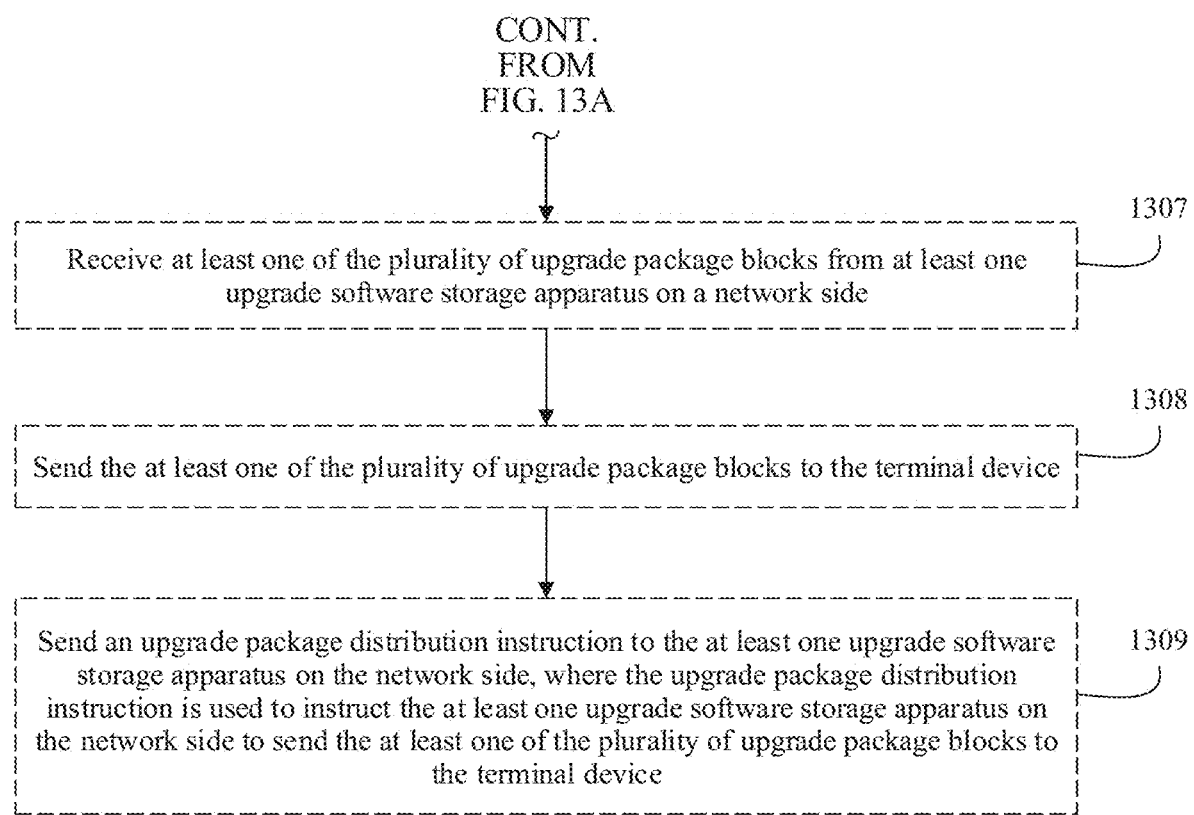

Embodiment 2 of the present application provides a software upgrading method performed on a network side. The method is performed by a software upgrading apparatus (for example, the software upgrading apparatus 701, 801, 901, 1001, or 1101 described above) on a network side. As shown in FIG. 13A and FIG. 13B, the method includes the following steps.

Optionally, Embodiment 2 of the present application includes step 1301: Send a software upgrading starting message to a terminal device.

Step 1302: Receive storage resource feedback information from the terminal device, where the storage resource feedback information includes at least an available storage capacity of each of a plurality of components that are in the terminal device and that may be used to store a plurality of upgrade package blocks.

Step 1303: Determine, based on the storage resource feedback information, that an available storage resource in the terminal device satisfies a storage requirement for software upgrading.

Step 1304: Divide one or more software upgrade packages into a plurality of upgrade package blocks based on the storage resource feedback information, where the plurality of upgrade package blocks are in a one-to-one correspondence with at least some of the available storage capacities of all the components.

Step 1305: Generate upgrade package block information, where the upgrade package block information includes at least a correspondence between the plurality of upgrade package blocks and the at least some of the available storage capacities of all the components.

Step 1306: Send the upgrade package block information to the terminal device.

Optionally, Embodiment 2 of the present application includes step 1307: Receive at least one of the plurality of upgrade package blocks from at least one upgrade software storage apparatus on the network side.

Optionally, Embodiment 2 of the present application includes step 1308: Send the at least one of the plurality of upgrade package blocks to the terminal device.

Optionally, Embodiment 2 of the present application includes step 1309: Send an upgrade package distribution instruction to the at least one upgrade software storage apparatus on the network side, where the upgrade package distribution instruction is used to instruct the at least one upgrade software storage apparatus on the network side to send the at least one of the plurality of upgrade package blocks to the terminal device.

In the software upgrading methods provided in Embodiment 1 and Embodiment 2 of the present application, storage resources in a plurality of components in the terminal are fully utilized. In this way, a downloading success rate is increased, and the methods are more suitable for a requirement for software upgrading of a relatively complex terminal (especially an intelligent connected vehicle). In addition, a plurality of upgrade package blocks may be downloaded by using external communication resources of the plurality of components in the terminal. In this way, communication resources of the terminal are fully utilized, a download speed is increased, and downloading reliability is improved. Moreover, the plurality of upgrade package blocks may be independently verified by a plurality of components, so that a computing resource in the terminal is fully utilized; and a case in which upgrading of a component is affected due to incomplete upgrade software block data of another component is avoided.

Embodiment 1 and Embodiment 2 of the present application are respectively related to software upgrading methods performed on a network side and a software upgrading method performed on a terminal side. Embodiment 3 of the present application provides a software upgrading method performed between two sides: a network side and a terminal side, and the software upgrading method can be implemented based on a combination of the two software upgrading methods that are respectively performed on the network side and the terminal side and that are provided in Embodiment 1 and Embodiment 2 of the present application. Because there are a relatively large quantity of parallel solutions in a phase of querying and reporting a storage resource in a terminal, a phase of performing block division on a software upgrade package, and a phase of sending upgrade package block information and indication information, the following describes the foregoing several phases in detail by using FIG. 14 to FIG. 19. It should be noted that, cross-reference may be made to Embodiment 1, Embodiment 2, and Embodiment 3 of the present application. Single-side operation steps on a terminal side or a network side in FIG. 14 to FIG. 19 may also be applied to the single-side operation methods in Embodiment 1 and Embodiment 2 of the present application.

Figure 14:
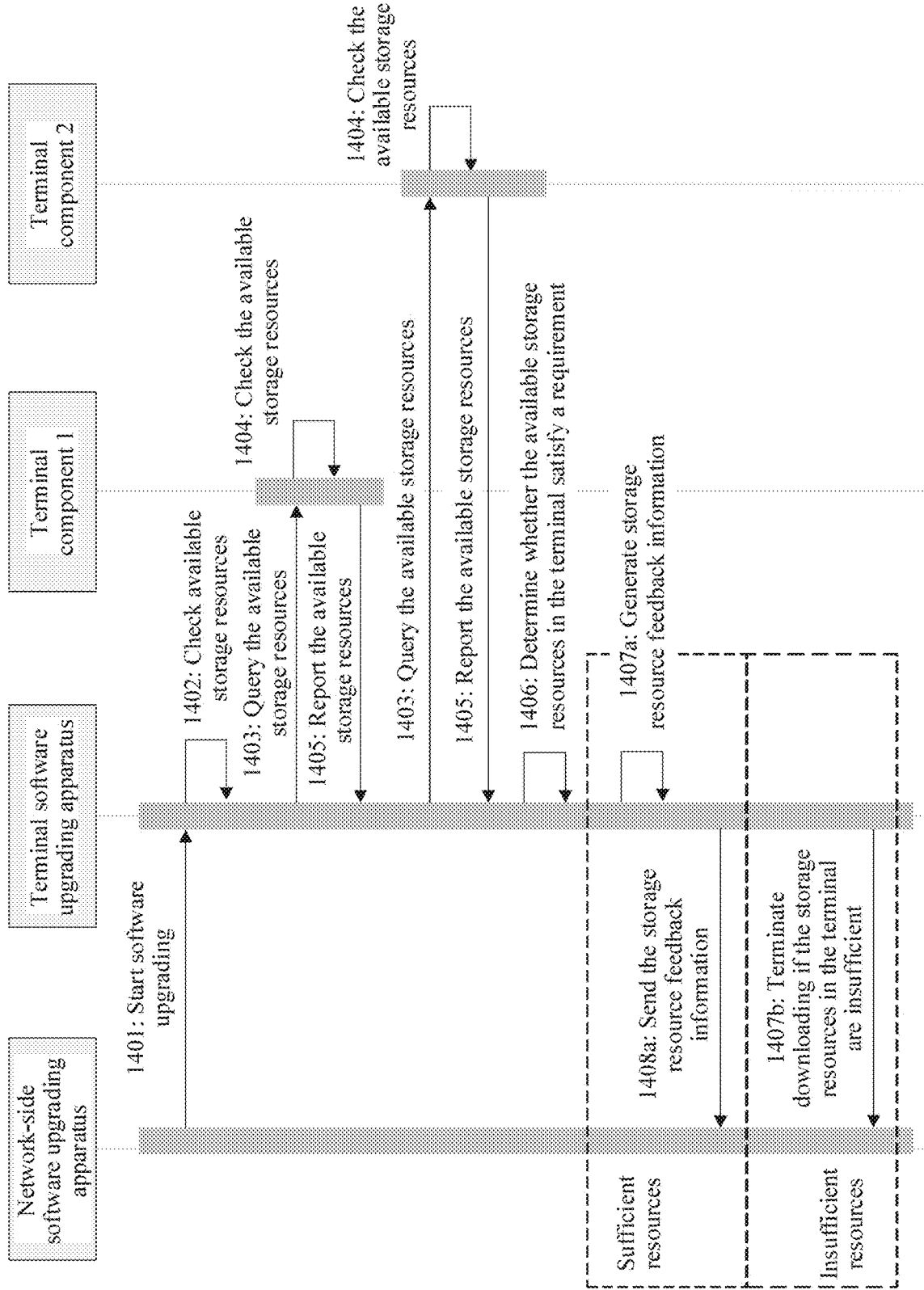
FIG. 14 is a flowchart of a phase of querying and reporting a storage resource in a terminal in a software upgrading method according to Embodiment 3 of the present application.

FIG. 14 is a flowchart of a phase of querying and reporting a storage resource in a terminal in Embodiment 3 of the present application. The phase includes the following steps.

Step 1401: A software upgrading apparatus on a network side sends, to a terminal software upgrading apparatus, a message for starting terminal software upgrading.

Step 1402: The terminal software upgrading apparatus checks its own available storage resource (denoted as $t_1$).

Step 1403: The terminal software upgrading apparatus initiates a storage resource query request to a terminal component 1 and a terminal component 2.

Step 1404: The terminal component 1 and the terminal component 2 check their own available storage resources.

Step 1405: The terminal component 1 and the terminal component 2 report their own available storage resources (respectively denoted as $t_2$ and $t_3$) to the terminal software upgrading apparatus.

Step 1406: The terminal software upgrading apparatus calculates a sum of available storage resources in the terminal, that is, calculates a sum of $t_1$, $t_2$, and $t_3$, to determine whether the available storage resources in the terminal satisfy a storage requirement for terminal software upgrading.

If the available storage resources in the terminal satisfy the storage requirement for terminal software upgrading, the following steps are further performed: Step 1407a: The terminal software upgrading apparatus generates storage resource feedback information. Step 1408a: The terminal software upgrading apparatus sends the storage resource feedback information to the software upgrading apparatus on the network side.

If the available storage resources in the terminal do not satisfy the storage requirement for terminal software upgrading, the following step is further performed: Step 1407b: The terminal software upgrading apparatus returns an error to the software upgrading apparatus on the network side, and terminates terminal software upgrading.

It should be noted that, whether the available storage resources in the terminal satisfy the storage requirement for terminal software upgrading may be determined by a terminal device or by a network side device.

Figure 15:
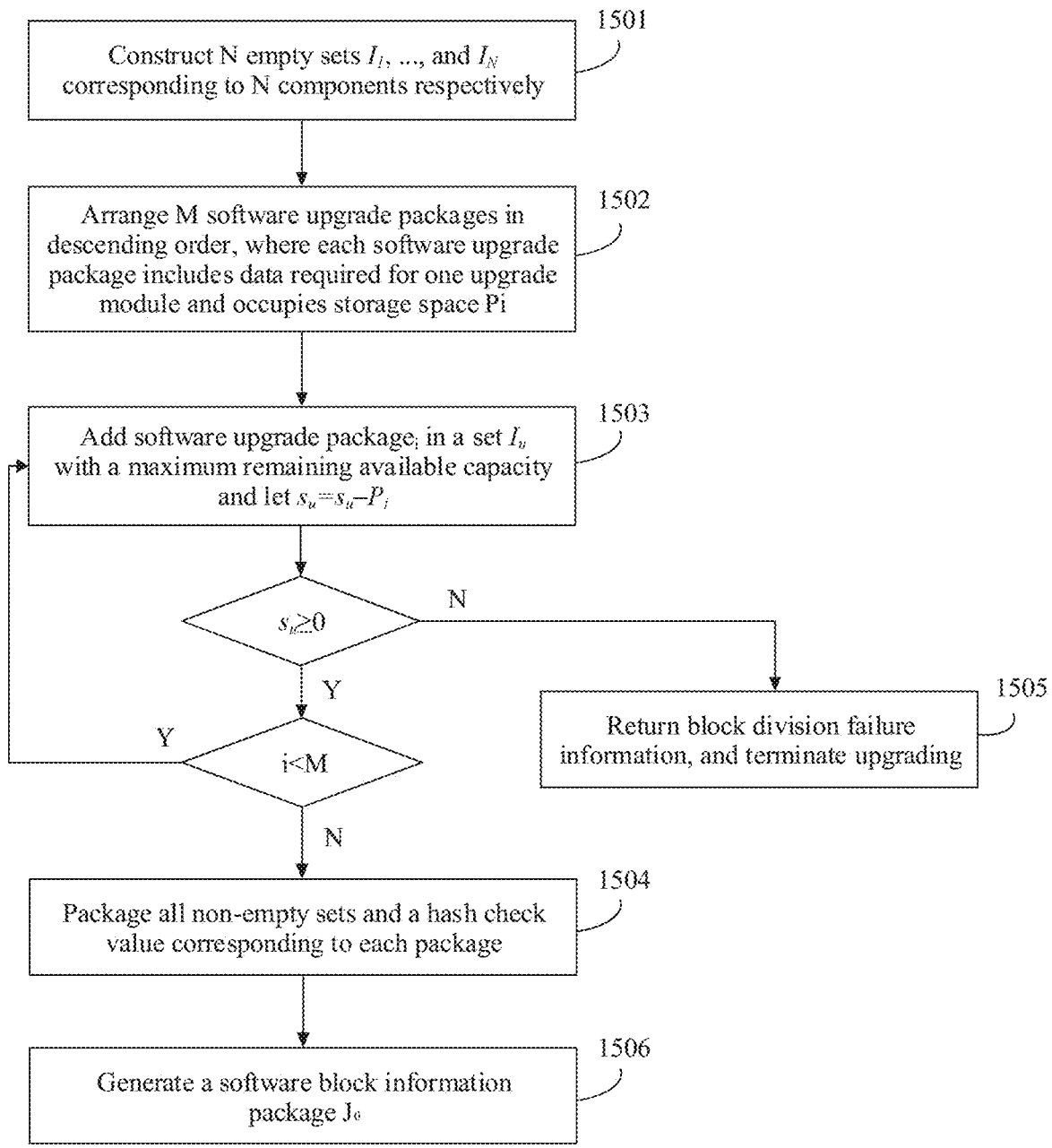
FIG. 15 is a flowchart of a phase of performing block division on a software upgrade package in the software upgrading method according to Embodiment 3 of the present application.

In a phase of performing block division on a software upgrade package, after receiving the storage resource feedback information sent by the terminal software upgrading apparatus, the software upgrading apparatus on the network side divides a plurality of terminal software upgrade packages into a plurality of upgrade package blocks with hash check values. A block division procedure is shown in FIG. 15, and includes the following steps.

Step 1501: Construct N empty sets that are respectively denoted as $I_1, \ldots,$ and $I_N$, and mark a maximum capacity value in each set by using N variables $s_1, \ldots,$ and $s_N$, where $s_i=t_i-C$, $t_i$ is an available storage resource of an $i^{th}$ component of the terminal, and C is storage space occupied by a hash check value.

Step 1502: Arrange M software upgrade packages in descending order of sizes to obtain $package_1, package_2, \ldots$, and $package_M$, where each software upgrade package includes data used for software upgrading of one terminal component and occupies storage space $P_i$.

Step 1503: Place $package_i$ in a set $I_u$ with a maximum remaining available capacity starting from a software upgrade package with a largest size (that is, $package_1$), where $1 \le u \le N$. and let $s_u=s_u-P_i$.

If $s_u<0$ in this case, it indicates that the block division fails, and the following step is further performed: Step 1505: Return block division failure information, and terminate downloading.

If $s_u \ge 0$ in this case, step 1503 is sequentially performed on $package_2$ to $package_M$ until $package_2$ to $package_M$ can all be successfully added to the set, and the following step is further performed: Step 1504: Package each non-empty set and a corresponding hash value to obtain upgrade package blocks, which are denoted as $J_1, \ldots,$ and $J_K$. K is a quantity of non-empty sets. $J_i=I_u||H_u$, $1 \le i \le K$, $H_u$ is a hash check value corresponding to $I_u$, and a calculation method is $H_u=\text{Hash}(I_u||key_u)$. The software upgrading apparatus on the network side stores device keys ($key_u$) corresponding to a plurality of components ($Id_u$) in the terminal, and the device keys are the same as device keys locally stored in the components.

Step 1506: The software upgrading apparatus on the network side generates a block information package $J_0$. Content of the block information package $J_0$ includes a block quantity K, a download address $Address_i$ of each block $J_i$, a corresponding download component $Id_a$, and a hash check value $H_0$.

In the phase of performing block division on a software upgrade package, a software upgrade package used for a single to-be-upgraded component of the terminal is used as a minimum unit, and a software upgrade package that occupies maximum space is preferably considered and is allocated to a block with maximum remaining space. The block division is completed through iteration, and then a hash check value is calculated for each piece of block data to prepare for subsequent data integrity verification.

The following describes an execution procedure of a phase of sending upgrade package block information and indication information. There are four parallel technical solutions.

Figure 16:
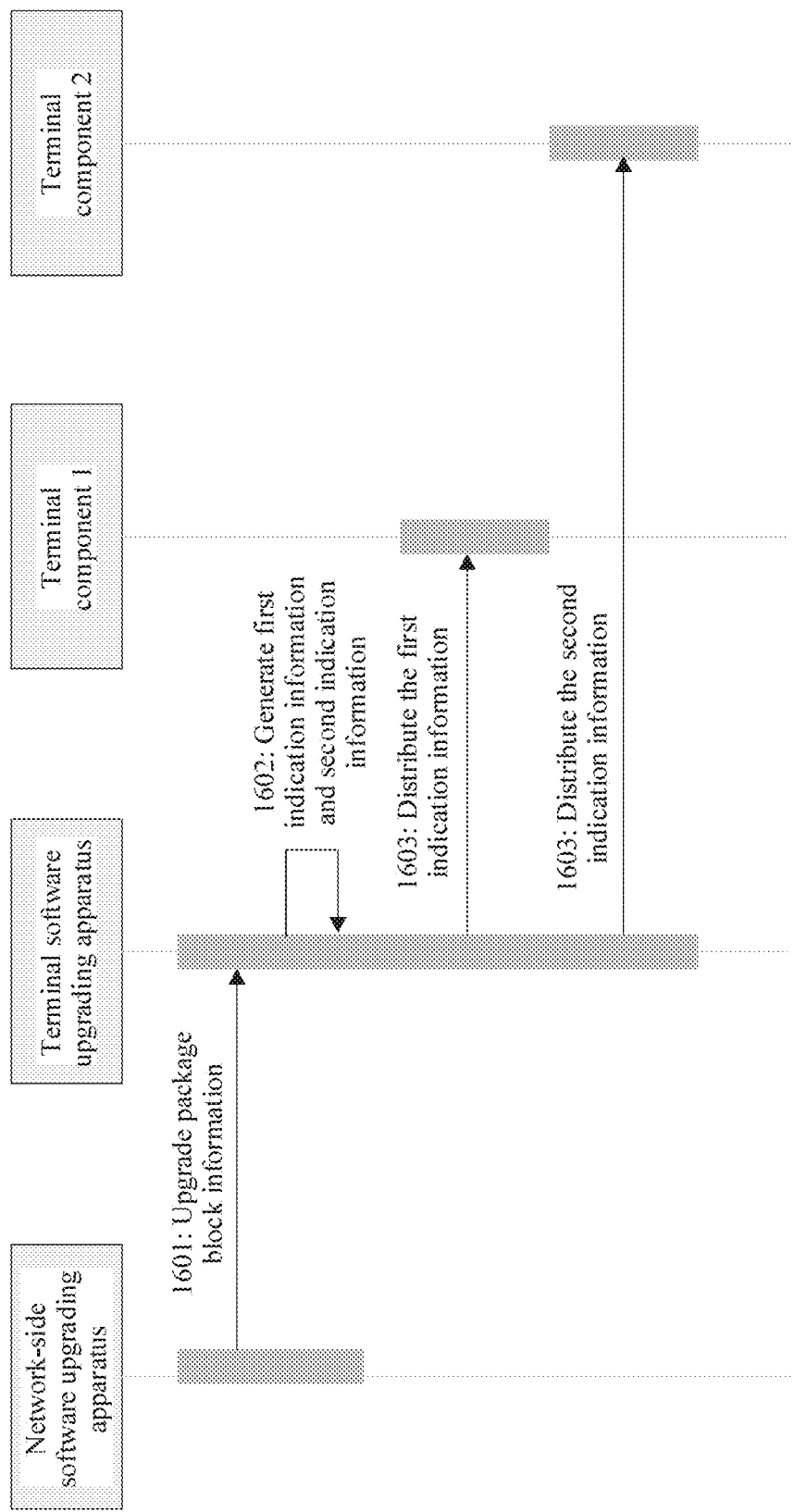
FIG. 16 is a first flowchart of a phase of sending upgrade package block information and indication information in the software upgrading method according to Embodiment 3 of the present application.

For a first solution, refer to FIG. 16. The solution includes the following steps.

Step 1601: The terminal software upgrading apparatus receives upgrade package block information from the software upgrading apparatus on the network side.

Step 1602: The terminal software upgrading apparatus generates, for the terminal component 1, first indication information used to indicate the terminal component 1 to obtain one upgrade package block corresponding to the terminal component 1, and generates, for the terminal component 2, second indication information used to indicate the terminal component 2 to obtain one upgrade package block corresponding to the terminal component 2.

Step 1603: The terminal software upgrading apparatus respectively sends the first indication information and the second indication information to the terminal component 1 and the terminal component 2.

Figure 17:
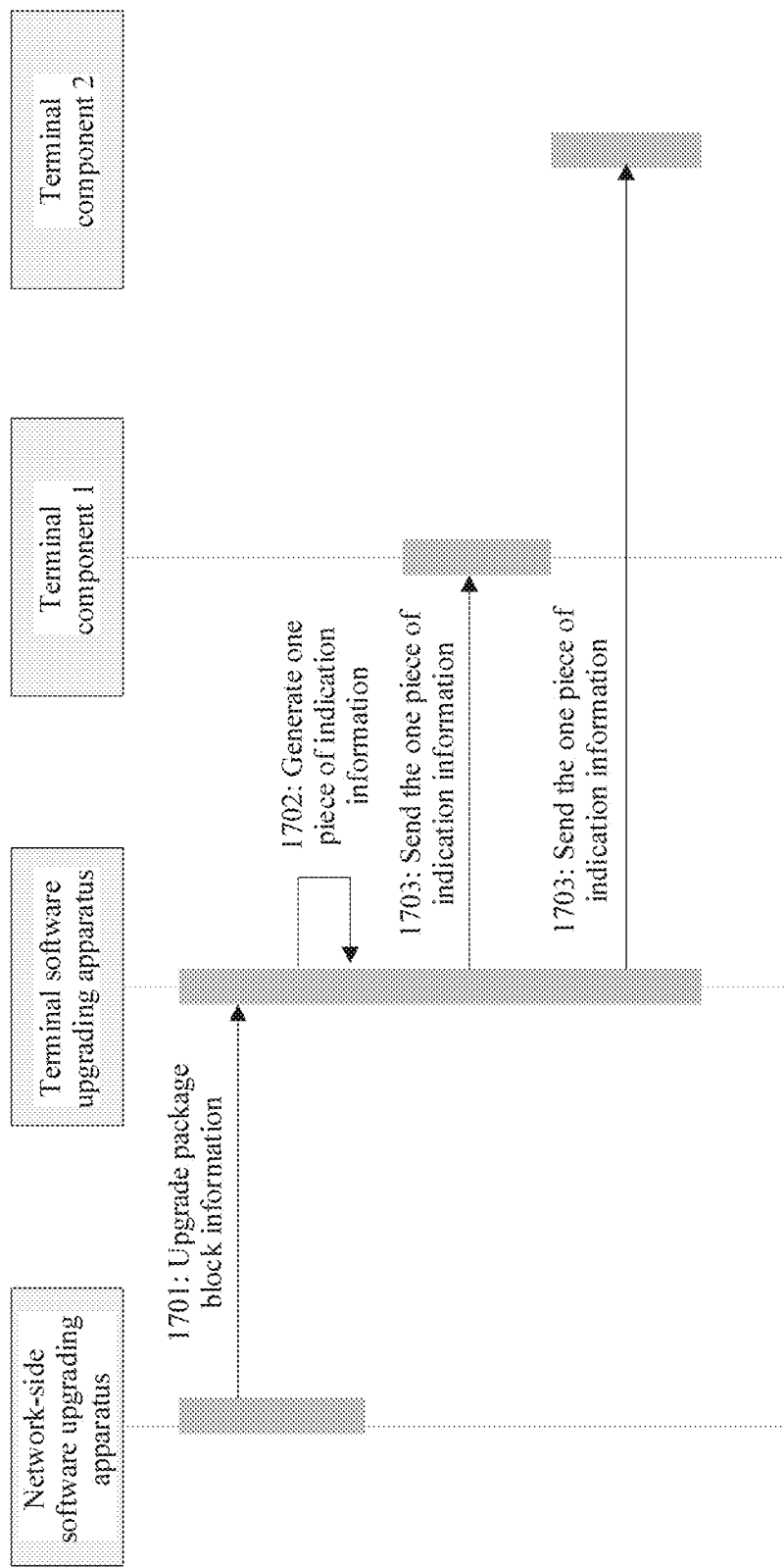
FIG. 17 is a second flowchart of a phase of sending upgrade package block information and indication information in the software upgrading method according to Embodiment 3 of the present application.

For a second solution, refer to FIG. 17. The solution includes the following steps.

Step 1701: The terminal software upgrading apparatus receives upgrade package block information from the software upgrading apparatus on the network side.

Step 1702: The terminal software upgrading apparatus generates, for the terminal component 1 and the terminal component 2, one piece of indication information that is used to indicate the terminal component 1 to obtain an upgrade package block corresponding to the terminal component 1 and indicate the terminal component 2 to obtain an upgrade package block corresponding to the terminal component 2.

Step 1703: The terminal software upgrading apparatus sends the one piece of indication information to both the terminal component 1 and the terminal component 2. Optionally, the terminal software upgrading apparatus may send the one piece of indication information to the terminal component 1 and the terminal component 2 simultaneously or sequentially.

Figure 18:
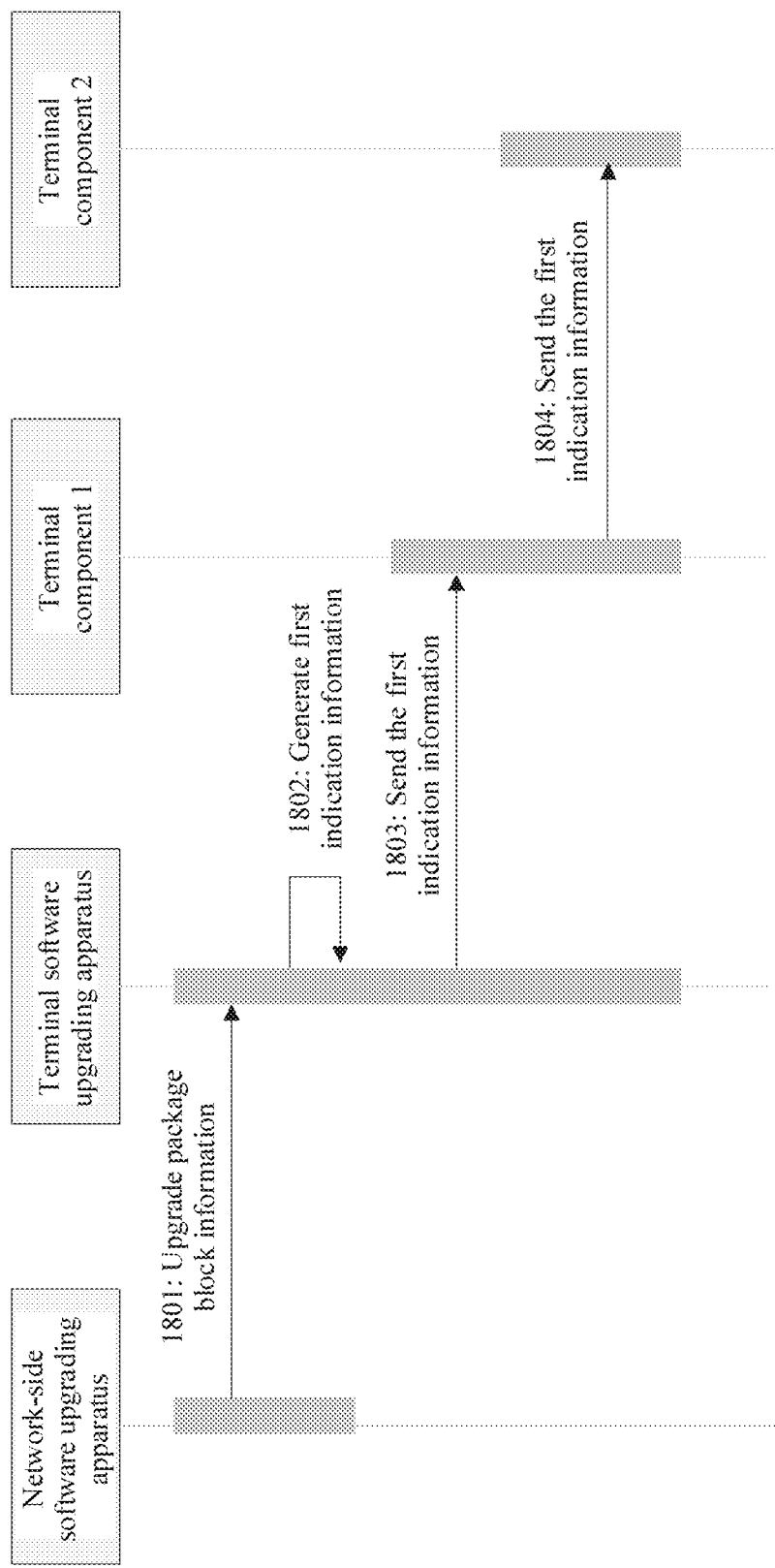
FIG. 18 is a third flowchart of a phase of sending upgrade package block information and indication information in the software upgrading method according to Embodiment 3 of the present application.

For a third solution, refer to FIG. 18. The solution includes the following steps.

Step 1801: The terminal software upgrading apparatus receives upgrade package block information from the software upgrading apparatus on the network side.

Step 1802: The terminal software upgrading apparatus generates, for the terminal component 1 and the terminal component 2, first indication information that is used to indicate the terminal component 1 to obtain an upgrade package block corresponding to the terminal component 1 and indicate the terminal component 2 to obtain an upgrade package block corresponding to the terminal component 2.

Step 1803: The terminal software upgrading apparatus sends the first indication information to the terminal component 1.

Step 1804: The terminal component 1 forwards the first indication information to the terminal component 2.

Figure 19:
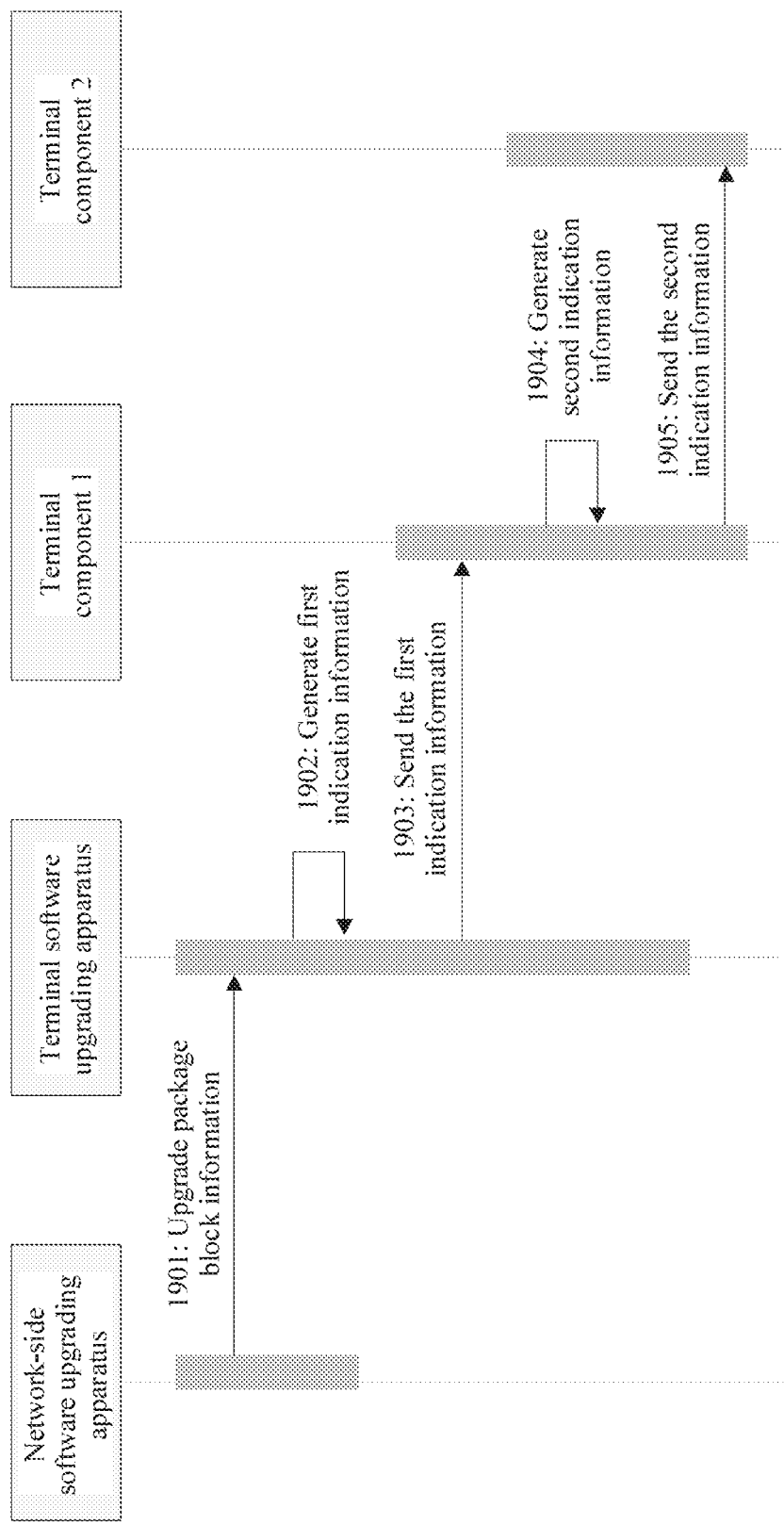
FIG. 19 is a fourth flowchart of a phase of sending upgrade package block information and indication information in the software upgrading method according to Embodiment 3 of the present application.

For a fourth solution, refer to FIG. 19. The solution includes the following steps:

Step 1901: The terminal software upgrading apparatus receives upgrade package block information from the software upgrading apparatus on the network side.

Step 1902: The terminal software upgrading apparatus generates, for the terminal component 1 and the terminal component 2, first indication information that is used to indicate the terminal component 1 to obtain an upgrade package block corresponding to the terminal component 1 and indicate the terminal component 2 to obtain an upgrade package block corresponding to the terminal component 2.

Step 1903: The terminal software upgrading apparatus sends the first indication information to the terminal component 1.

Step 1904: The terminal component 1 deletes, from the first indication information, information related to obtaining of an upgrade package block by the terminal component 1, and generates second indication information based on remaining information in the first indication information.

Step 1905: The terminal component 1 sends the second indication information to the terminal component 2.

Figure 20:
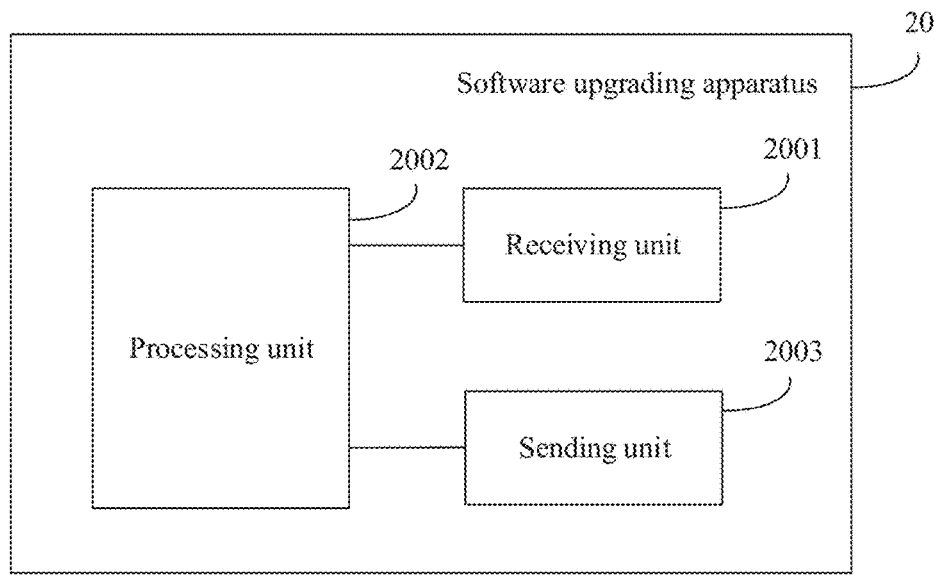
FIG. 20 is a block diagram of a structure of a software upgrading apparatus according to Embodiment 4 and Embodiment 5 of the present application.

Embodiment 4 and Embodiment 5 of the present application provide a software upgrading apparatus on a terminal side and a software upgrading apparatus on a network side respectively, as shown in FIG. 20.

The software upgrading apparatus 20 on the terminal side provided in Embodiment 4 of the present application includes:

a receiving unit 2001, configured to receive storage resource information of at least two components in a terminal and upgrade package block information generated by a network side device, where the storage resource information includes at least an available storage capacity of each of the at least two components, the upgrade package block information includes at least a one-to-one correspondence between a plurality of upgrade package blocks for terminal software upgrading and a plurality of components for storing the plurality of upgrade package blocks, and the plurality of components are some or all components of the at least two components;

a processing unit 2002, configured to: generate storage resource feedback information based on the storage resource information, and generate, based on the upgrade package block information, at least one piece of indication information used to indicate the plurality of components to obtain the plurality of upgrade package blocks, where the plurality of components are in a one-to-one correspondence with the plurality of available storage capacities; and the storage resource feedback information includes at least the available storage capacity of each of the at least two components; and a sending unit 2003, configured to: send the storage resource feedback information to a network side device, and send the at least one piece of indication information to the plurality of components.

The software upgrading apparatus 20 on the terminal side provided in Embodiment 4 of the present application is, for example, the software upgrading apparatus 401, the T-box 501, a sub-apparatus in the T-box 501, or the intelligent connected vehicle 601.

The software upgrading apparatus 20 on the network side provided in Embodiment 5 of the present application includes:

a receiving unit 2001, configured to receive storage resource feedback information from a terminal device, where the storage resource feedback information includes at least an available storage capacity of each of a plurality of components that are in the terminal device and that may be used to store a plurality of upgrade package blocks;

a processing unit 2002, configured to: divide one or more software upgrade packages into a plurality of upgrade package blocks based on the storage resource feedback information, and generate upgrade package block information, where the plurality of upgrade package blocks are in a one-to-one correspondence with at least some of a plurality of components, and the upgrade package block information includes at least a correspondence between the plurality of upgrade package blocks and the at least some components; and a sending unit 2003, configured to send the upgrade package block information to the terminal device.

The software upgrading apparatus 20 on the network side provided by Embodiment 5 of the present application is, for example, the foregoing software upgrading apparatuses 701, 801, 901, 1001, or 1101.

Only one or more of the units in Embodiment 4 and Embodiment 5 may be implemented by software, hardware, firmware, or a combination thereof. The software or firmware includes but is not limited to computer program instructions or code, and may be executed by a hardware processor. The hardware includes but is not limited to various integrated circuits, such as a central processing unit (CPU), a digital signal processor (DSP), a field programmable gate array (FPGA), or an application-specific integrated circuit (ASIC).

Optionally, the receiving units 2001 in Embodiment 4 and Embodiment 5 may use one or more receiving manners. The receiving manner includes but is not limited to receiving a parameter through cellular communication, Wi-Fi (Wireless Fidelity, wireless local area network), WiMAX (Worldwide Interoperability for Microwave Access), Bluetooth (Bluetooth communications technology), ZigBee (ZigBee communications technology), optical communication, satellite communication, infrared communication, transmission line communication, a hardware interface, or a cable on a hardware circuit board, or obtaining a parameter from a software module, or reading information from a memory.

Optionally, the receiving unit 2001 in Embodiment 4 and Embodiment 5 includes a plurality of receiving subunits, and the plurality of receiving subunits each are configured to receive storage resource information of at least one of the at least two components in the terminal. Optionally, the plurality of receiving subunits are located in a plurality of different components in the terminal. Optionally, the plurality of receiving subunits receive the storage resource information in at least one receiving manner. The receiving manner includes but is not limited to receiving a parameter through cellular communication, Wi-Fi (Wireless Fidelity, wireless local area network), WiMAX (Worldwide Interoperability for Microwave Access), Bluetooth (Bluetooth communications technology), ZigBee (ZigBee communications technology), optical communication, satellite communication, infrared communication, transmission line communication, a hardware interface, or a cable on a hardware circuit board, or obtaining a parameter from a software module, or reading information from a memory.

Optionally, the sending units 2003 in Embodiment 4 and Embodiment 5 may use one or more sending manners. The sending manner includes but is not limited to sending a parameter through cellular communication, Wi-Fi (Wireless Fidelity, wireless local area network), WiMAX (Worldwide Interoperability for Microwave Access), Bluetooth (Bluetooth communications technology), ZigBee (ZigBee communications technology), optical communication, satellite communication, infrared communication, transmission line communication, a hardware interface, or a cable on a hardware circuit board, or entering a parameter to a software module, or writing information into a memory.

Optionally, the sending units 2003 in Embodiment 4 and Embodiment 5 include a plurality of sending subunits, and the plurality of sending subunits each are configured to send the at least one piece of indication information to the plurality of components. Optionally, the plurality of sending subunits are located in a plurality of different components in the terminal. Optionally, the plurality of sending subunits send the storage resource information in at least one sending manner. The sending manner includes but is not limited to sending a parameter through cellular communication, Wi-Fi (Wireless Fidelity, wireless local area network), WiMAX (Worldwide Interoperability for Microwave Access), Bluetooth (Bluetooth communications technology), ZigBee (ZigBee communications technology), optical communication, satellite communication, infrared communication, transmission line communication, a hardware interface, or a cable on a hardware circuit board, or entering a parameter to a software module, or writing information into a memory.

Figure 21:
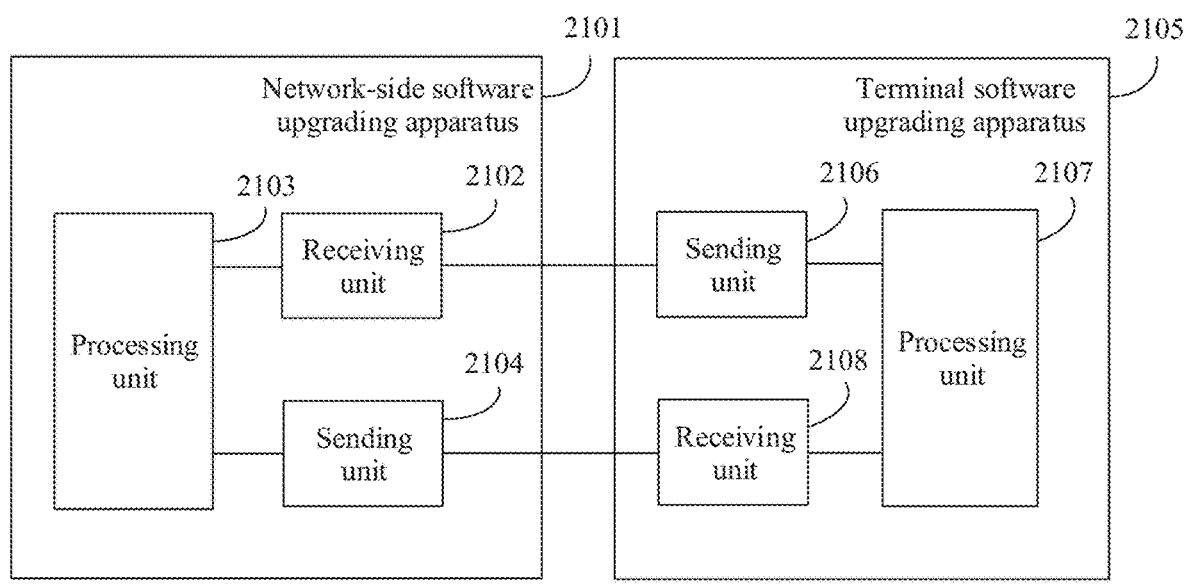
FIG. 21 is a block diagram of a structure of a software upgrading system according to Embodiment 6 of the present application.

Embodiment 6 of the present application provides a software upgrading system. Refer to FIG. 21, the system includes a network-side software upgrading apparatus 2101 and a terminal software upgrading apparatus 2105. The network-side software upgrading apparatus 2101 includes a receiving unit 2102, a processing unit 2103, and a sending unit 2104. The terminal software upgrading apparatus 2105 includes a sending unit 2106, a processing unit 2107, and a receiving unit 2108. The network-side software upgrading apparatus 2101 and the terminal software upgrading apparatus 2105 may be implemented with reference to Embodiment 4 and Embodiment 5 of the present application respectively.

Figure 22:
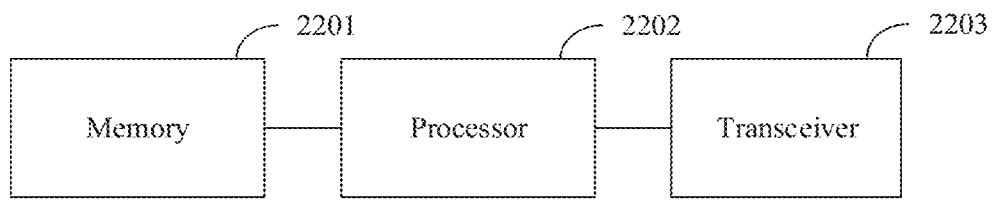
FIG. 22 is a block diagram of a structure of a software upgrading apparatus according to Embodiment 7 and Embodiment 8 of the present application.

Embodiment 7 of the present application provides another software upgrading apparatus on a terminal side. Refer to FIG. 22, the apparatus includes a memory 2201, a processor 2202, and a transceiver 2203. The memory 2201 stores computer program instructions. The processor 2202 runs the computer program instructions to execute the software upgrading method on the terminal side described in Embodiment 1. The transceiver 2203 is configured to receive the storage resource information or the upgrade package block information, or configured to send at least one of the storage resource feedback information, the at least one piece of indication information, the download instruction, the upgrade package distribution instruction, and the installation activation instruction.

The software upgrading apparatus on the terminal side provided in Embodiment 7 of the present application is, for example, the software upgrading apparatus 401, the T-box 501, a sub-apparatus in the T-box 501, or the intelligent connected vehicle 601. The following separately describes an implementation of Embodiment 7 of the present application on a specific component in an intelligent terminal by using an example in which the software upgrading apparatus is implemented on a T-box (refer to FIG. 23) and a man-machine interaction controller (refer to FIG. 24).

Figure 23:
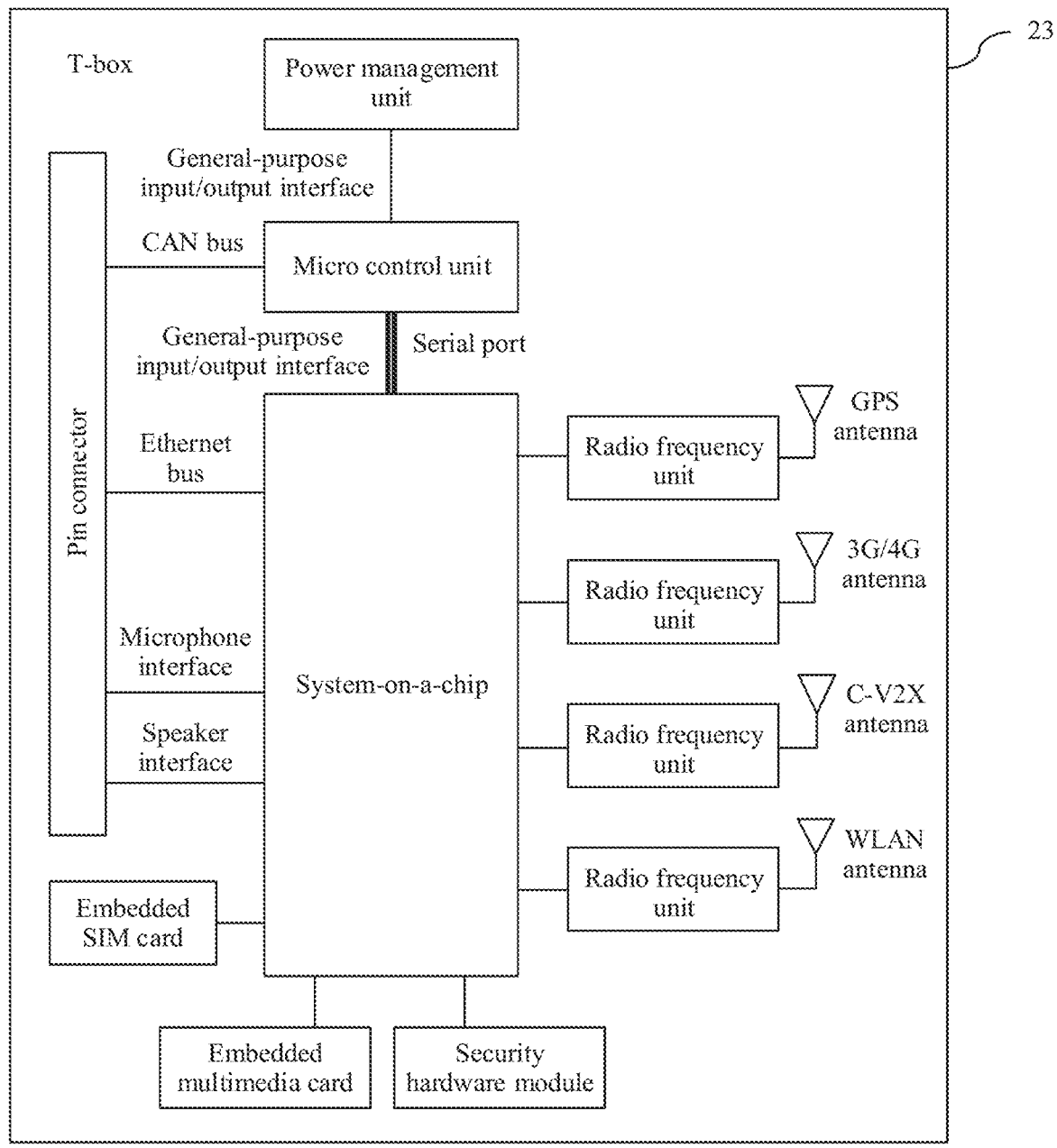
FIG. 23 is a schematic diagram of implementation, on a T-box, of the software upgrading apparatus on a terminal side that is provided in Embodiment 7 of the present application.

For example, an internal composition structure of the T-box is a structure of a T-box 23 shown in FIG. 23. The T-box 23 includes a GPS (Global Positioning System) antenna, a 3G/4G antenna, a C-V2X (Cellular Vehicle-to-Everything) antenna, a WLAN (Wireless Local Area Network) antenna, and a plurality of radio frequency units, which are used for communication between a vehicle and an extranet. A system-on-a-chip (SOC) integrates a processor, a memory, a system-level chip control logic module, a plurality of interface control modules, and a plurality of interconnection buses, and is configured to provide a function such as control, computation, or storage for the T-box 23. As an implementation form of the processor, a micro control unit may also provide a control or computation function for the T-box 23. When gaining access to a cellular communications network as a mobile communications terminal, an intelligent connected vehicle uses an embedded SIM (Subscriber Identity Module) card in the T-box 23 to identify an identity. An embedded multimedia card provides a storage function for the T-box 23. A security hardware module provides a security protection function for the intelligent connected vehicle to gain access the extranet. A power management unit provides power supply management for the T-box 23. In addition, the T-box 23 further interacts with another component in the vehicle through a plurality of buses (for example, a CAN bus and an Ethernet bus) and interfaces (for example, a microphone interface and a speaker interface).

The memory 2201 in Embodiment 7 may be implemented by using the memory integrated in the system-on-a-chip or another internal storage unit (for example, the embedded multimedia card) in FIG. 23. The processor 2202 may be implemented by using the micro control unit or the processor integrated in the system-on-a-chip in FIG. 23. The transceiver 2203 may be implemented by using the radio frequency unit, the GPS antenna, the 3G/4G antenna, the C-V2X antenna, the WLAN antenna, the CAN (Controller Area Network) bus, the Ethernet bus or a pin connector in FIG. 23.

Figure 24:
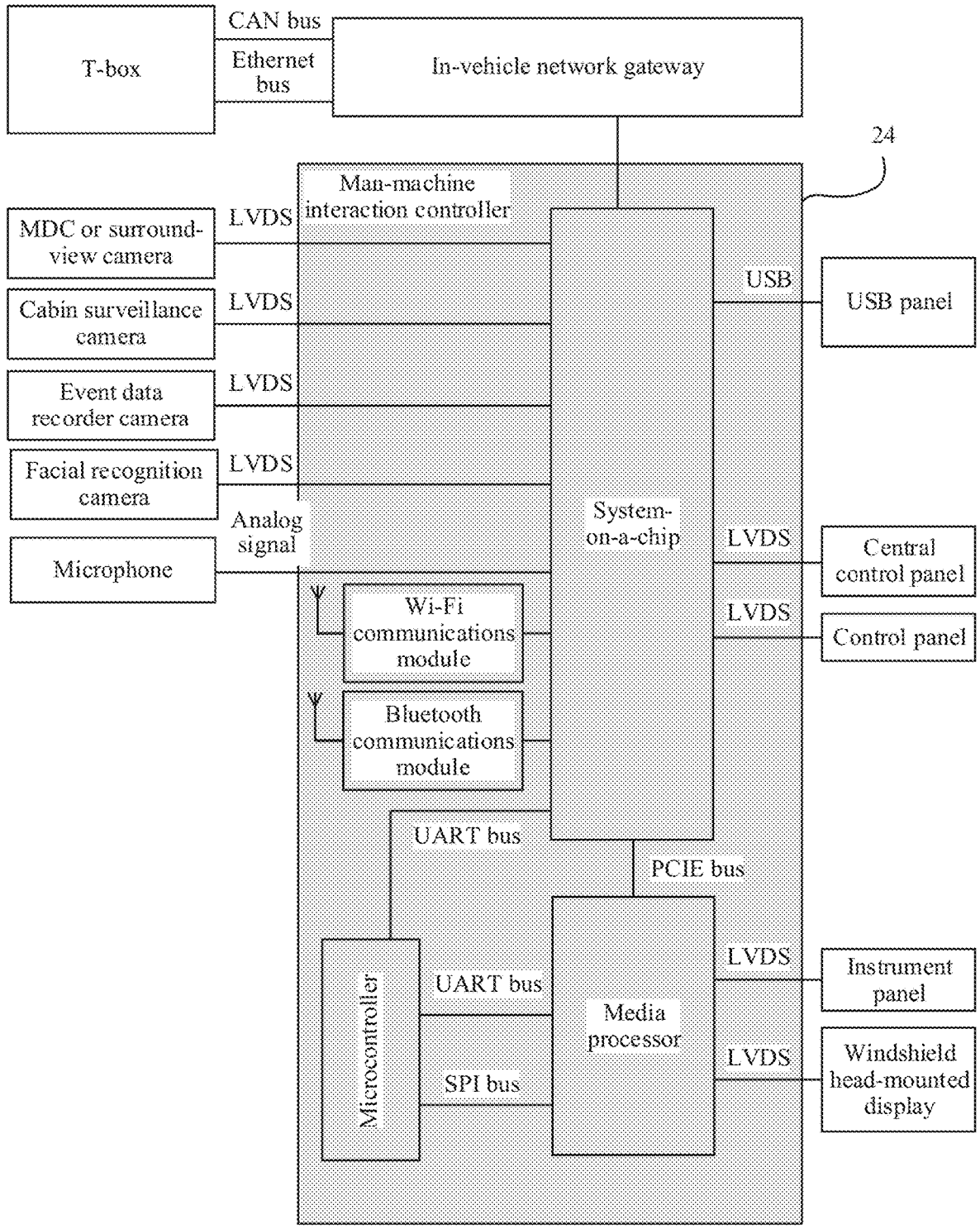
FIG. 24 is a schematic diagram of implementation, on a human-machine interaction controller, of the software upgrading apparatus on the terminal side that is provided in Embodiment 7 of the present application.

For example, an internal composition structure of the man-machine interaction controller is a structure of a man-machine interaction controller 24 in FIG. 24, and the controller includes a Wi-Fi (Wireless Fidelity, wireless local area network) communications module and a Bluetooth communications module used for communication between a vehicle and an extranet. A system-on-a-chip (SOC) integrates a processor, a memory, a system-level chip control logic module, a plurality of interface control modules, and a plurality of interconnection buses, and provides a function such as control, computation, or storage for the man-machine interaction controller 24. As an implementation form of the processor, a micro control unit may also provide a control or computation function for the man-machine interaction controller 24. A multimedia processor provides a data processing function for multimedia information such as an image, audio, and a video. The man-machine interaction controller 24 obtains signal input from various camera sensors through an LVDS (Low-Voltage Differential Signal) interface, and obtains data input from a microphone through an analog signal interface. The man-machine interaction controller 24 provides signal output for a USB panel, a central control panel, a control panel, an instrument panel, and a windshield head-mounted display through a USB (Universal Serial Bus) port or the LVDS interface. In addition, the man-machine interaction controller 24 is further connected to an in-vehicle network gateway, to perform in-vehicle network communication with an in-vehicle component such as a T-box.

The memory 2201 in Embodiment 7 may be implemented by using the memory integrated in the system-on-a-chip or another internal storage unit (for example, an embedded multimedia card) in FIG. 24. The processor 2202 may be implemented by using a microcontroller or the processor integrated in the system-on-a-chip in FIG. 24. The transceiver 2203 may be implemented by using the Wi-Fi (Wireless Fidelity, wireless local area network) communications module, the Bluetooth communications module, or the communications bus between the in-vehicle network gateways in FIG. 24.

Embodiment 8 of the present application provides still another software upgrading apparatus on a network side. Refer to FIG. 22, the apparatus includes a memory 2201, a processor 2202, and a transceiver 2203. The memory 2201 stores computer program instructions. The processor 2202 runs the computer program instructions to execute the software upgrading method on the network side described in Embodiment 2, and is configured to receive the storage resource feedback information or at least one of the plurality of upgrade package blocks, or configured to send at least one of the upgrade package block information, the software upgrading start message, the upgrade package distribution instruction, and the at least one upgrade package block.

The software upgrading apparatus on the network side provided by Embodiment 8 of the present application is, for example, the foregoing software upgrading apparatuses 701, 801, 901, 1001, or 1101.

The processors in Embodiment 7 and Embodiment 8 of the present application include but are not limited to various CPUs. DSPs, microcontrollers, microprocessors, or artificial intelligence processors.

The transceivers in Embodiment 7 and Embodiment 8 of the present application include but are not limited to a communication interface, a communications module, or a communications connector. A communication form of the transceiver includes but is not limited to 2G (2nd generation mobile communications technology), 3G (3rd generation mobile communications technology), 4G (4th generation mobile communications technology), 5G (5th generation mobile communications technology), and Wi-Fi (Wireless Fidelity, wireless local area network), WiMAX (Worldwide Interoperability for Microwave Access), Bluetooth (Bluetooth communications technology), ZigBee (ZigBee communications technology), optical communication, satellite communication, infrared communication, and the like.

A person skilled in the art may clearly understand that, descriptions of embodiments provided in this application may be mutually referenced. For ease and brevity of description, for example, for functions of the apparatuses and devices and performed steps that are provided in embodiments of this application, refer to related descriptions in method embodiments of this application. Reference can also be made between various method embodiments and between various apparatus embodiments.

A person skilled in the art may understand that all or some of the steps of the method embodiments may be implemented by using hardware related to a program instruction. The program may be stored in a computer-readable storage medium. When the program is executed, some or all of the steps of the method embodiments are performed. The foregoing storage medium includes various media that can store program code, such as a ROM, a RAM, a magnetic disk, or an optical disc.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on a computer, all or some of the procedures or functions according to embodiments of the present application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid-State Drive (SSD)), or the like.

In the several embodiments provided in this application, it should be understood that the disclosed system, apparatus, and method may be implemented in other manners without departing from the scope of this application. For example, the described embodiment is merely an example. For example, division into the modules or units is merely logical function division and may be other division in actual implementation. For example, a plurality of units or components may be combined or integrated into another system, or some features may be ignored or not performed. The units described as separate parts may or may not be physically separate, and parts displayed as units may or may not be physical units, may be located in one position, or may be distributed on a plurality of network units. Some or all the modules may be selected according to an actual need to achieve the objectives of the solutions of embodiments. A person of ordinary skill in the art may understand and implement embodiments without creative efforts.

In addition, the schematic diagrams illustrating the system, apparatus, method, and different embodiments may be combined or integrated with other systems, modules, technologies or methods without departing from the scope of this application. In addition, the displayed or discussed mutual couplings or direct couplings or communication connections may be implemented through some interfaces. The indirect couplings or communication connections between the apparatuses or units may be implemented in electronic, mechanical, or other forms.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An upgrading apparatus, comprising:
   at least one processor; and
   one or more memories coupled to the at least one processor and storing program instructions for execution by the at least one processor to:
      send storage-resource-feedback-information to a network side device, wherein the storage-resource-feedback-information is used to indicate an available storage capacity of each of multiple components in a terminal; and
      receive, from the network side device, upgrade-package-block-information, wherein the upgrade-package-block-information is used to indicate a one-to-one correspondence between at least two upgrade-package-blocks for upgrading the terminal and at least two of the multiple components, and wherein the at least two of the multiple components are used to store the at least two upgrade-package-blocks.

2. The upgrading apparatus according to claim 1, wherein the upgrade-package-block-information comprises at least one of:
   verification information of the at least two upgrade-package-blocks;
   at least one address for downloading the at least two upgrade-package-blocks; or
   a quantity of the at least two upgrade-package-blocks.

3. The upgrading apparatus according to claim 1, wherein the one or more memories store the program instructions for execution by the at least one processor to:
   receive multiple pieces of storage-resource-information from the multiple components, wherein the multiple pieces of storage-resource-information are used to indicate the available storage capacity of each of the multiple components, and wherein the storage-resource-feedback-information is generated based on the multiple pieces of storage-resource-information;
   send indication-information to at least one of the at least two of the multiple components, wherein the indication-information is used to obtain the at least two upgrade-package-blocks by the at least two of the multiple components, and wherein the indication-information is generated base on the upgrade-package-block-information.

4. The upgrading apparatus according to claim 3, wherein the indication-information comprises at least one of:
   an address for downloading an upgrade-package-block;
   verification information of an upgrade-package-block;
   an external communication resource used by the at least one of the at least two of the multiple components to obtain an upgrade-package-block; or
   time information for obtaining an upgrade-package-block.

5. The upgrading apparatus according to claim 3, wherein:
   the indication-information is multiple pieces of indication-information;
   the multiple pieces of indication-information are in a one-to-one correspondence with the at least two of the multiple components; and
   the one or more memories store the program instructions for execution by the at least one processor to:
      send each of the multiple pieces of indication-information to a corresponding component of the at least two of the multiple components.

6. The upgrading apparatus according to claim 3, wherein:
   the indication-information is one piece of indication-information; and
   the one or more memories store the program instructions for execution by the at least one processor to:
      send the one piece of indication-information to at least one of the at least two of the multiple components.

7. An upgrading apparatus, comprising:
   at least one processor; and
   one or more memories coupled to the at least one processor and storing program instructions for execution by the at least one processor to:
      receive multiple pieces of storage-resource-information from multiple components in a terminal, wherein the multiple pieces of storage-resource-information are used to indicate an available storage capacity of each of the multiple components; and
      send indication-information to at least one of the multiple components, wherein the indication-information is used to obtain at least two upgrade-package-blocks for upgrading the terminal by at least two of the multiple components, wherein the at least two of the multiple components are used to store the at least two upgrade-package-blocks, and wherein the at least two upgrade-package-blocks are in a one-to-one correspondence with the at least two of the multiple components.

8. The upgrading apparatus according to claim 7, wherein the indication-information comprises at least one of:
   an address for downloading tan upgrade-package-block;
   verification information of an upgrade-package-block;
   an external communication resource used by the at least one of the multiple components to obtain an upgrade-package-block; or
   time information for obtaining the upgrade-package-block.

9. The upgrading apparatus according to claim 7, wherein:
   the indication-information is multiple pieces of indication-information;

the multiple pieces of indication-information are in a one-to-one correspondence with the at least two of the multiple components; and the one or more memories store the program instructions for execution by the at least one processor to:

send each of the multiple pieces of indication-information to a corresponding component of the at least two of the multiple components.

10. The upgrading apparatus according to claim 7, wherein:

the indication-information is one piece of indication-information; and the one or more memories store the program instructions for execution by the at least one processor to:

send the one piece of indication-information to at least one of the at least two of the multiple components.

11. The upgrading apparatus according to claim 7, wherein the one or more memories store the program instructions for execution by the at least one processor to:

send storage-resource-feedback-information to a network side device, wherein the storage-resource-feedback-information is generated based on the multiple pieces of storage-resource-information and used to indicate an available storage capacity of each of the multiple components;

receive upgrade-package-block-information from the network side device, where the upgrade-package-block-information is used to indicate the one-to-one correspondence, and wherein the indication-information is generated base on the upgrade-package-block-information.

12. The upgrading apparatus according to claim 11, wherein the upgrade-package-block-information comprises at least one of:

verification information of the at least two upgrade-package-blocks;

at least one address for downloading the at least two upgrade-package-blocks; or a quantity of the at least two upgrade-package-blocks.

13. An upgrading apparatus, comprising:

at least one processor; and one or more memories coupled to the at least one processor and storing program instructions for execution by the at least one processor to:

receive storage-resource-feedback-information from a terminal, wherein the storage-resource-feedback-information is used to indicate an available storage capacity of each of multiple components in the terminal;

generate, based on the storage-resource-feedback-information, at least two upgrade-package-blocks for upgrading the terminal, wherein the at least two upgrade-package-blocks are in a one-to-one correspondence with at least two of the multiple components; and send upgrade-package-block-information to the terminal, wherein the upgrade-package-block-information is used to obtain the at least two upgrade-package-blocks by the at least two of the multiple components.

14. The upgrading apparatus according to claim 13, wherein the upgrade-package-block-information comprises at least one of:

verification information of the at least two upgrade-package-blocks;

at least one address for downloading the at least two upgrade-package-blocks; or a quantity of the at least two upgrade-package-blocks.

15. The upgrading apparatus according to claim 13, wherein the one or more memories store the program instructions for execution by the at least one processor to:

send an upgrade-package-distribution-instruction to an upgrade-software-storage-apparatus on a network side, where the upgrade-package-distribution-instruction is used to instruct the upgrade-software-storage-apparatus to send at least one of the at least two upgrade-package-blocks to the terminal.

16. The upgrading apparatus according to claim 13, wherein the one or more memories store the program instructions for execution by the at least one processor to:

send at least one of the at least two upgrade-package-blocks to the terminal.

17. The upgrading apparatus according to claim 16, wherein the one or more memories store the program instructions for execution by the at least one processor to:

receive the at least one of the at least two upgrade-package-blocks from an upgrade-software-storage-apparatus on a network side.

18. The upgrading apparatus according to claim 13, wherein the at least two upgrade-package-blocks are generated by dividing at least one package for upgrading the terminal.

19. The upgrading apparatus according to claim 13, wherein the upgrade-package-block-information is used to indicate the one-to-one correspondence.

20. The upgrading apparatus according to claim 13, wherein the one or more memories store the program instructions for execution by the at least one processor to:

determine, based on the storage-resource-feedback-information, that an available storage resource in the terminal satisfies a storage requirement for upgrading the terminal.

* * * * *

UNITED STATES PATENT AND TRADEMARK OFFICE
CERTIFICATE OF CORRECTION

PATENT NO. : 11,972,247 B2
APPLICATION NO. : 17/745580
DATED : April 30, 2024
INVENTOR(S) : Zhipeng Guo and Jianfen Peng It is certified that error appears in the above-identified patent and that said Letters Patent is hereby corrected as shown below:

In the Claims

Column 34, Line 58, Claim 8, please delete "tan" and insert therefore -- an --.

Signed and Sealed this
Third Day of September, 2024

Katherine Kelly Vidal
*Director of the United States Patent and Trademark Office*